Jan. 19, 1954  E. K. STANDISH  2,666,543
CARD PREPARING MACHINE
Filed Feb. 26, 1948  8 Sheets-Sheet 1
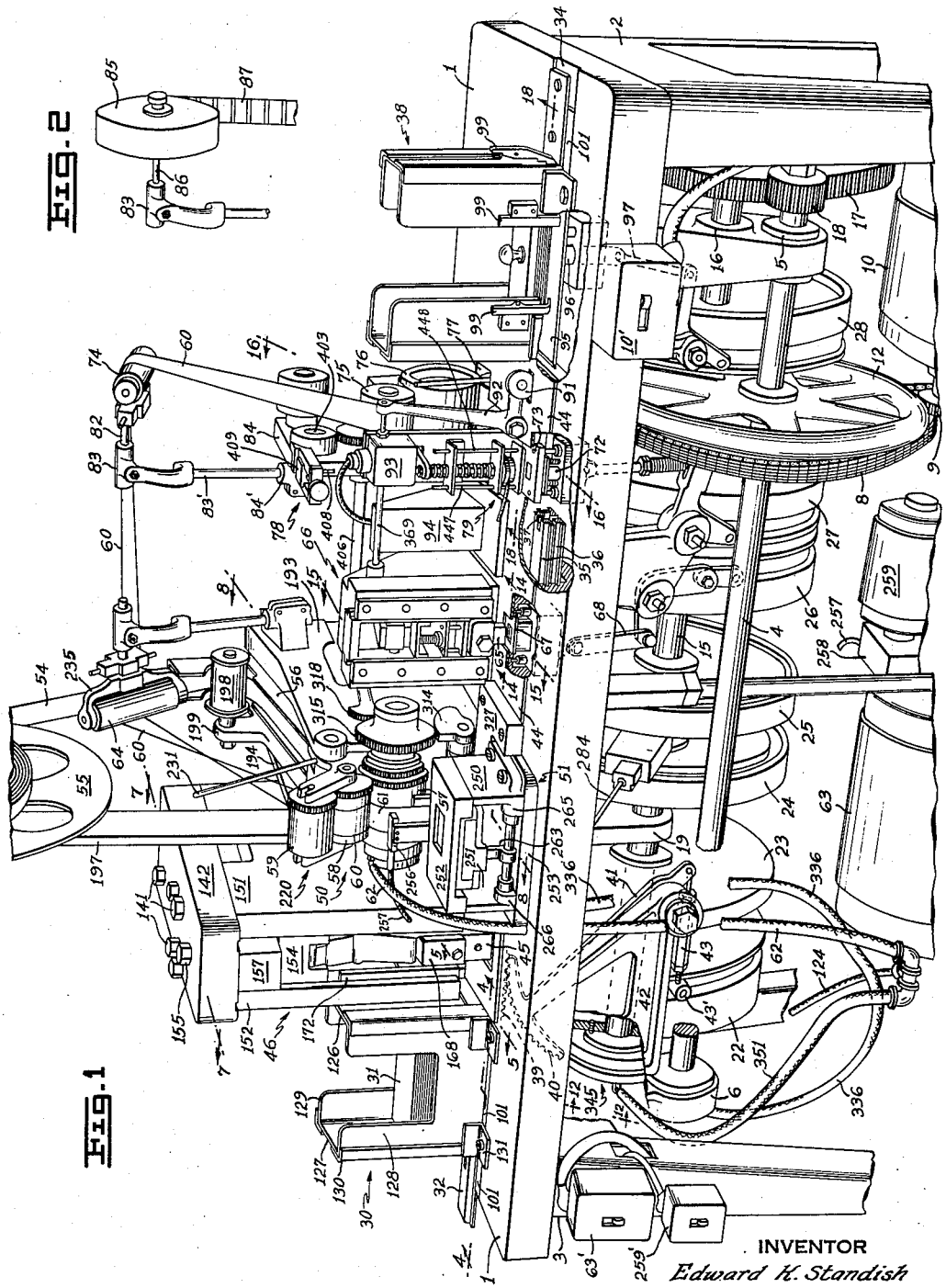
INVENTOR
*Edward K. Standish*
BY
*Pennie, Edmonds, Morton and Barrows*
ATTORNEYS Jan. 19, 1954      E. K. STANDISH      2,666,543
CARD PREPARING MACHINE
Filed Feb. 26, 1948      8 Sheets-Sheet 2
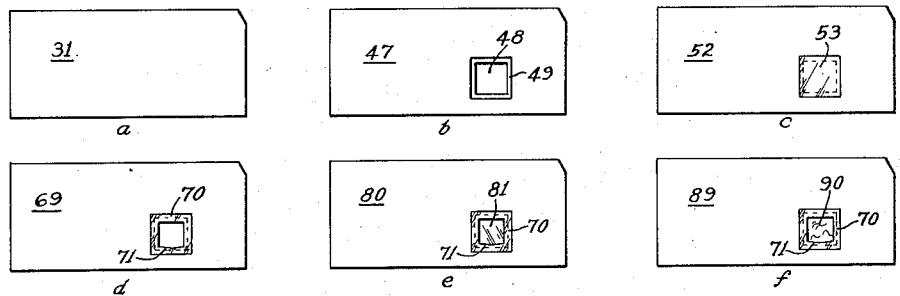
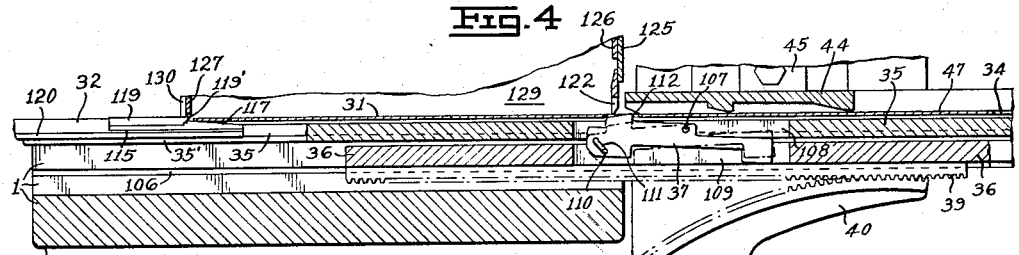
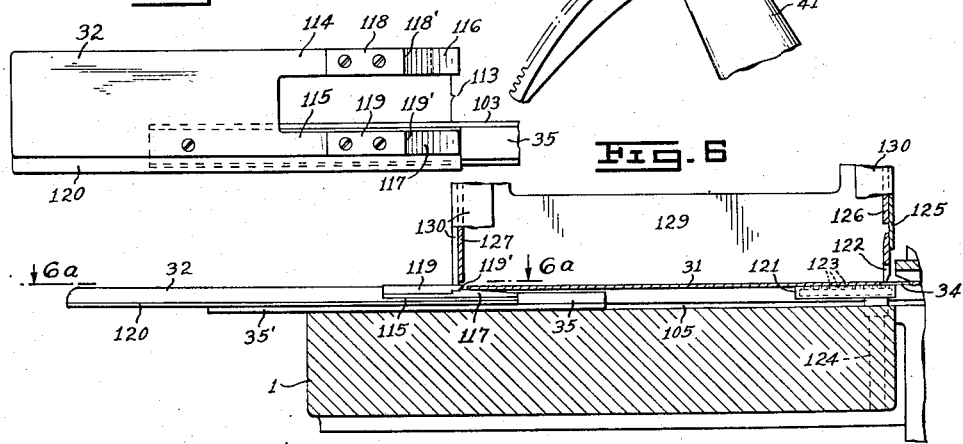
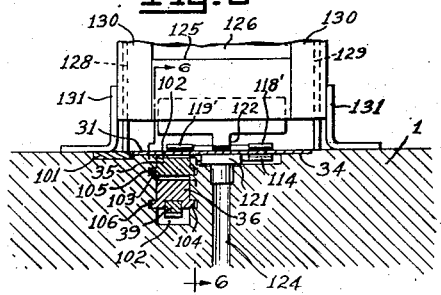
INVENTOR
Edward K. Standish
BY
ATTORNEYS

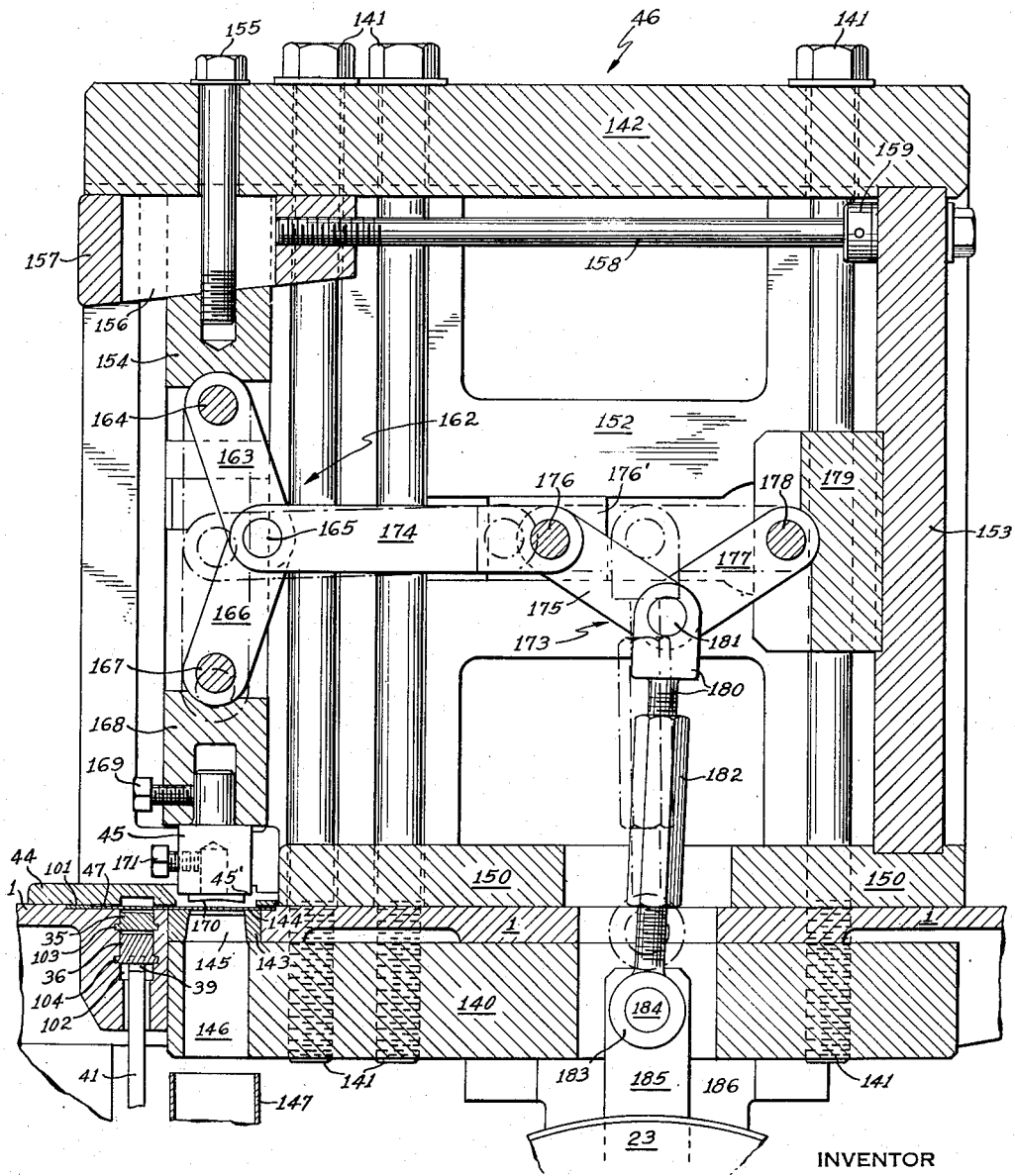

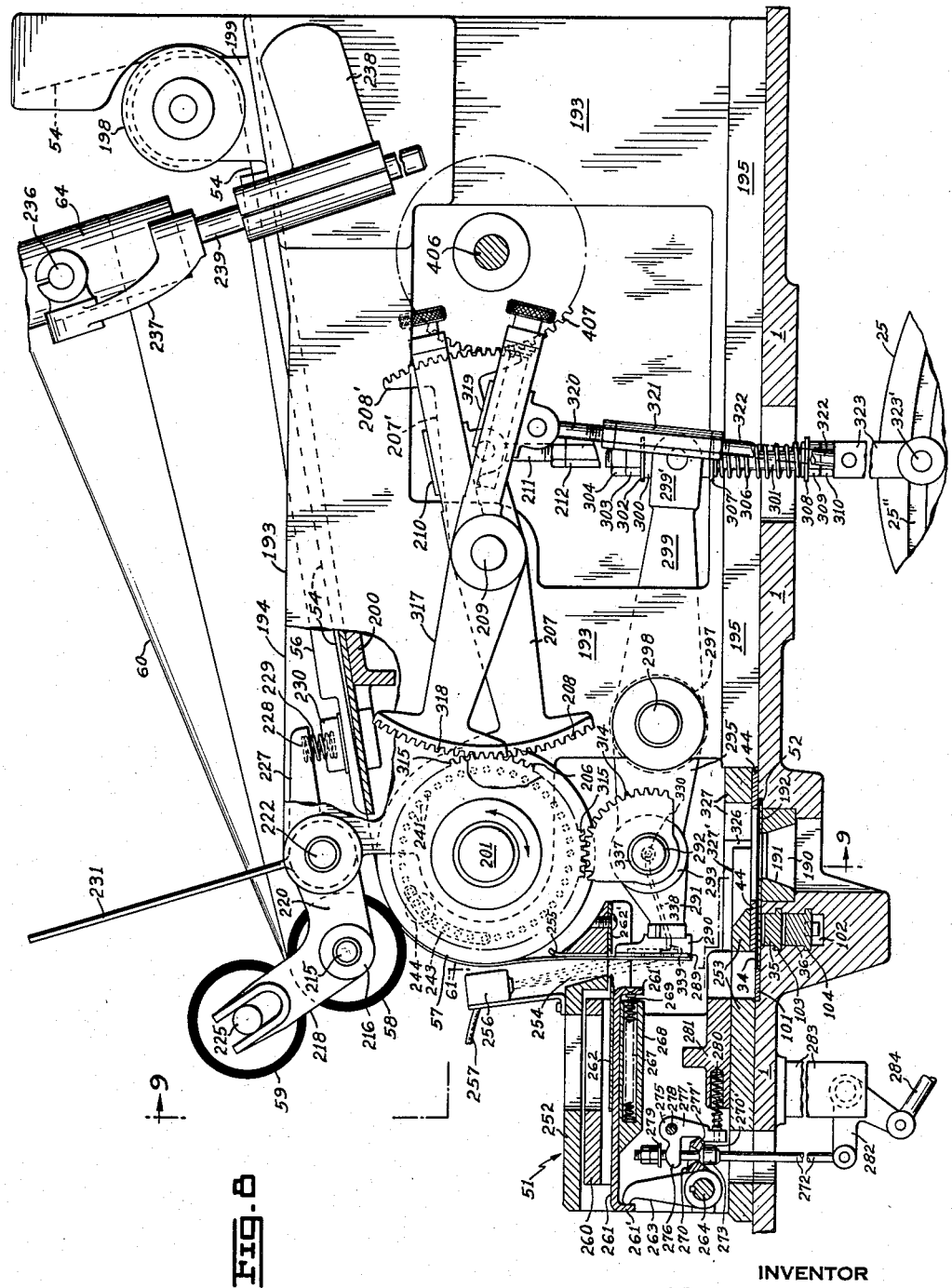

Jan. 19, 1954
E. K. STANDISH
2,666,543
CARD PREPARING MACHINE
Filed Feb. 26, 1948
8 Sheets-Sheet 5
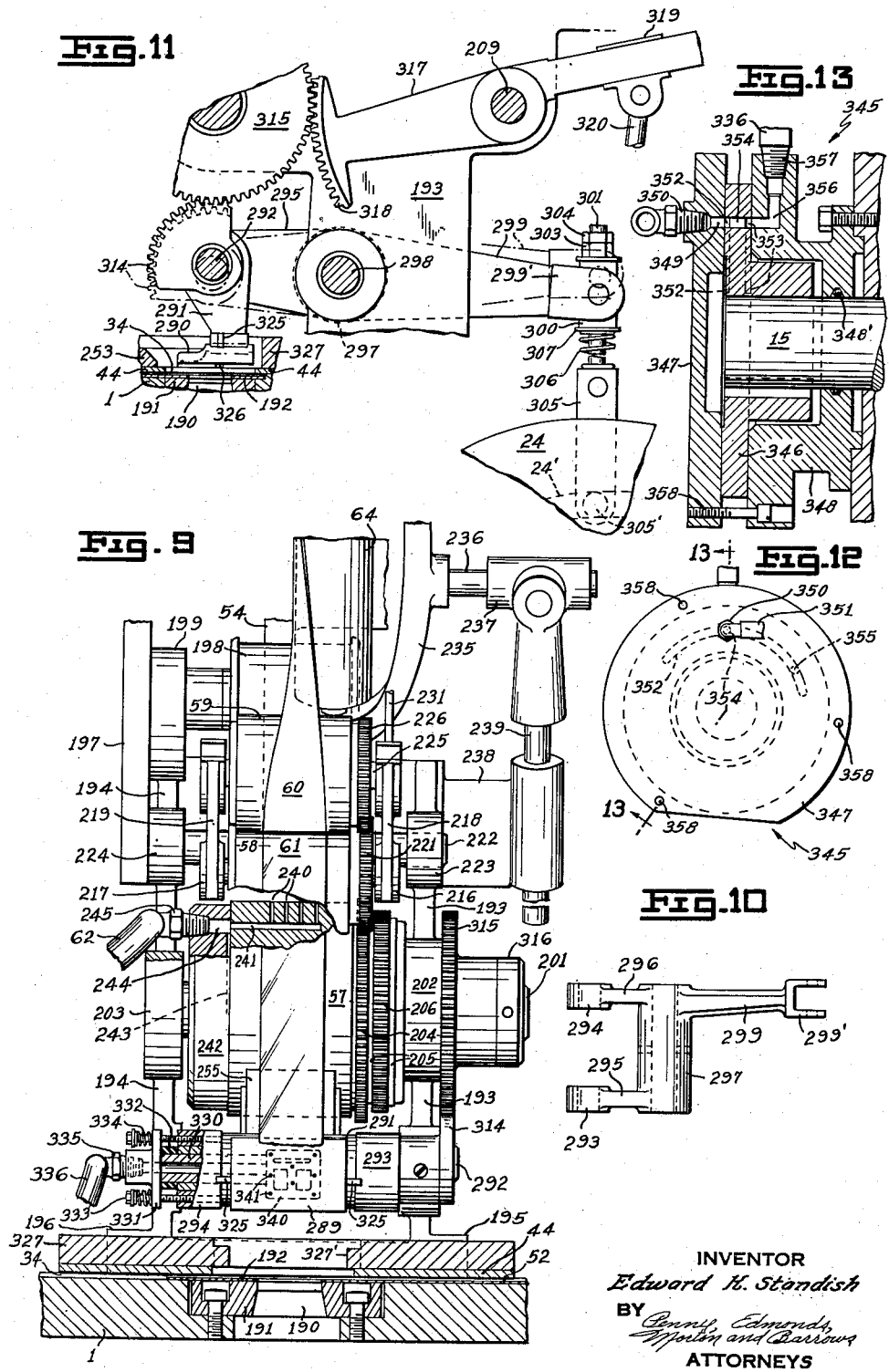
INVENTOR
Edward K. Standish
BY
Pennie, Edmonds,
Morton and Barrows
ATTORNEYS

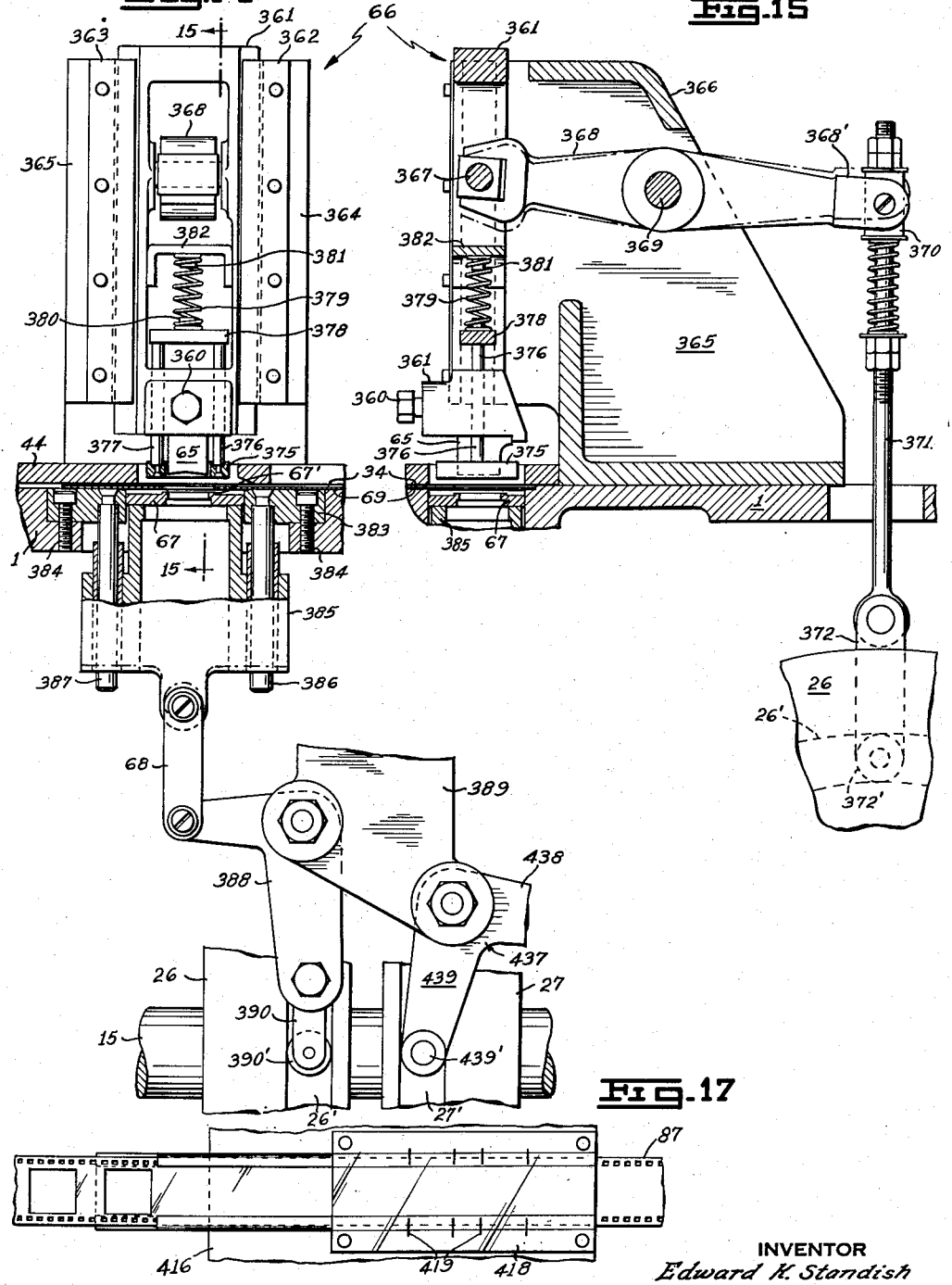

Jan. 19, 1954

E. K. STANDISH 2,666,543

CARD PREPARING MACHINE

Filed Feb. 26, 1948

INVENTOR
Edward K. Standish
BY
Cennis, Edmonds, Morton and Barrows
ATTORNEYS

Jan. 19, 1954 E. K. STANDISH 2,666,543
CARD PREPARING MACHINE
Filed Feb. 26, 1948 8 Sheets-Sheet 8

INVENTOR
Edward K. Standish
BY
Annie, Edmonds,
Morton and Barrows
ATTORNEYS

Patented Jan. 19, 1954

2,666,543

UNITED STATES PATENT OFFICE 2,666,543

CARD PREPARING MACHINE

Edward K. Standish, Stoughton, Mass., assignor, by mesne assignments, to Filmsort Inc., a corporation of Delaware Application February 26, 1948, Serial No. 11,055

28 Claims. (Cl. 216—25)

This invention relates to card preparing apparatus and more particularly to a card preparing and adhesive applying machine or apparatus for preparing cards with openings in them, with pressure-sensitive adhesive material applied to the cards around the openings and with a removable protective cover sheet in the opening, or with a section of microfilm or the like in the opening, secured to the pressure-sensitive adhesive material.

The improved machine or apparatus of the invention is intended and adapted for preparing classification cards, such as are used in mechanical punching, sorting, and classifying machines and other cards which are intended to have small sections of microfilm and the like mounted in openings therein.

The new machine has a number of cooperating and timed elements and parts for feeding the cards successively to a number of stations where the successive operations are carried out in timed relation in a rapid and automatic manner.

The invention includes a complete machine made up of a number of cooperating elements or mechanisms as well as various subcombinations thereof which when used together also form new machines. The invention also includes improvements in mechanism for various operations.

The machine with all of its elements and parts, various elements and parts of which can be advantageously used without others, includes the following successive stations and operations: (1) a card supply hopper and feeding device for feeding the cards successively; (2) a card punching or dieing out station, advantageously combined with a compressing operation, with mechanism for forming an aperture in the card and for compressing the portion of the card around the aperture to form a depression therein for receiving the edge of the pressure-sensitive adhesive material; (3) a station with mechanism for applying a section of pressure-sensitive material to the card to cover the opening therein; (4) a station where the central portion of the sheet of adhesive material is cut out and removed to leave a margin of such material extending into the opening in the card around its edges; (5a) a station where a removable protection sheet is cut out and applied to the opening in contact with such margin of adhesive material or (5b) a station where a section of microfilm or the like is cut out and applied to the opening against the marginal edge of pressure-sensitive material; and (6) a station where the finished cards are stacked.

The complete machine includes mechanism for each of the foregoing operations together with means for feeding cards individually and intermittently from the card feed hopper successively to the different stages, to be operated on successively; and operating means for operating the mechanisms at the different stations simultaneously on successive cards as they are fed progressively from the feed hopper to the first station and from each station to the next and finally to the card stacking hopper or to other place of collection of the finished cards.

While the complete machine advantageously includes all of the stations above referred to and is adapted for feeding blank cards and for making finished cards with a microfilm or the like secured in place in the opening against the pressure-sensitive adhesive material, or for making finished cards with a protective cover sheet such as glassine secured in the opening in the card against the adhesive material, the machine includes elements which can be used in various subcombinations to particular advantage. If the cards have previously been provided with an aperture or opening therein, the punching operation can be omitted and the machine used as a mounting machine for applying the adhesive material and for mounting microfilms and the like in the opening against the adhesive material. If cards are desired with the pressure-sensitive adhesive material extending over the entire opening in the card, the dieing out operation for cutting out the central portion of the adhesive sheet can be omitted. If cards are desired which have an opening therein and a compressed shoulder around the opening, for subsequent treatment in a mounting machine the feeding and punching and compressing operations can advantageously be carried without the subsequent operations.

The new machine is advantageously constructed with a common bed plate and with a card feed trough therein and with the various stations located along the feed trough at spaced intervals and with the mechanism of the various stations mounted on the bed plate. The machine is advantageously operated from a common drive shaft and through a series of cams and cam operated levers, etc. for operating the card feeding mechanism and the mechanism of the various stations in timed relation so that the cards are operated on at the successive stations simultaneously and are then fed by the feeding device from each station to the next intermittently between such simultaneous operations. In addition to the complete machine and new subcombinations of elements and mechanism thereof the invention includes improvements in mechanism for feeding the cards successively and intermittently from the card supply hopper to the successive stations; improvements in punching and compressing mechanism for forming the openings or apertures in the cards and for forming a compressed shoulder around the opening; improvements in mechanism for applying the pressure-sensitive adhesive material to the card including supply means for supplying a continuous roll of pressure-sensitive adhesive material and protective cover sheet, separating the adhesive sheet from the cover sheet, cutting off sections of the adhesive material and applying it to the card around the opening; improvements in dieing out mechanism for punching out the central portion of the adhesive material in the opening to leave a margin of pressure-sensitive adhesive material extending into the opening; improvements in mechanism for applying protective cover sheet material such as glassine and cutting out sections thereof and inserting it in the opening in the card against the pressure-sensitive adhesive material; improvements in supplying microfilm and the like and cutting out film sections and mounting them in the opening in the card against the pressure-sensitive adhesive material; and improvements in stacking mechanism for stacking the finished cards.

The operating mechanism and the mechanism at the various stations are advantageously so constructed that one or more of the operating mechanisms can be omitted or rendered inactive while using others in various combinations.

The cards which the improved machine of the present invention is particularly designed to prepare are classification cards such as are used in mechanical punching, sorting and classifying systems such as those of the International Business Machines Company of the so-called McBee System. Such cards are commonly made of thin, hard material of a thickness around 0.007 inch in thickness, more or less. The pressure-sensitive adhesive material used in preparing the cards has a thickness, for example, of around 0.001 inch, more or less, and is advantageously of thin, transparent material such as cellophane or cellulosic sheet material coated with pressure sensitive adhesive, such as the products sold under the trade names "Clearseal" and "Duroseal." The prepared cards are intended particularly for the insertion in the openings against the pressure-sensitive material of sections of microfilm or motion picture film sections or frames, or transparent or translucent material having addresses or other typed or printed matter thereon.

The improved machine enables the finished cards with the sections of microfilm or the like therein to be prepared, where this is desired. The improved machine is also particularly advantageous for preparing cards with a removable protective cover sheet of glassine or the like in the opening against the pressure sensitive adhesive material, which cards can be subsequently used, by removal of the protective layer, and insertion of the sections of microfilm or the like therein, for preparing the final cards.

The nature and advantages of the invention will more fully appear from the following more detailed description illustrating a preferred embodiment thereof, but it is intended and understood that the invention is illustrated thereby but is not limited thereto.

The improved machine is illustrated in the accompanying drawings, in which

Fig. 1 shows the card preparing machine in perspective and with parts broken away;

Fig. 2 shows in perspective a modified form of part of the machine, particularly a film reel for use when microfilms or the like are to be inserted in the openings in the card, instead of the removable protective cover sheet;

Fig. 3 shows in six views, (a) to (f), a classification card at successive stages, from the initial card to the finished card;

Fig. 4 is a partial longitudinal section taken approximately along the lines 4—4 of Fig. 1, showing part of the card feed mechanism;

Fig. 5 is a partial transverse sectional view taken approximately along the line 5—5 of Fig. 1 and showing part of the card feed mechanism;

Fig. 6 is a longitudinal sectional view taken along the line 6—6 of Fig. 5 but showing the card feed picked unit and the upper card feed slide in elevation;

Fig. 6 (a) is a plan view of the card feed picker unit taken along the line 6a—6a of Fig. 6;

Fig. 7 is a transverse sectional view of the card punching and compressing unit taken approximately along the line 7—7 of Fig. 1;

Fig. 8 is a transverse sectional view of the adhesive material feeding, separating, cutting and applying units taken approximately along the lines 8—8 of Fig. 1;

Fig. 9 is a front view partly in elevation and with parts in section, of the adhesive material feeding, separating and applying units taken along the lines 9—9 of Fig. 8;

Fig. 10 is a plan view of the pressure applying rocker member, also shown in Fig. 11;

Fig. 11 is a transverse elevational view of the adhesive material applying mechanism, also shown in Fig. 8, but with the transfer arm in position for applying the adhesive section;

Fig. 12 is an enlarged end view of the vacuum distributor unit as seen from the position indicated by the arrows 12—12 of Fig. 1;

Fig. 13 is a further enlarged longitudinal sectional view of the vacuum distributor unit taken along the lines 13—13 of Fig. 12;

Fig. 14 is a front view, mainly in elevation, but partly in section, taken along the lines 14—14 of Fig. 1 showing the punch and die units for punching out the adhesive sheet;

Fig. 15 is a transverse section view taken along the lines 15—15 of Fig. 14 and 15—15 of Fig. 1;

Fig. 17 is a plan view taken along the line 17—17 of Fig. 16 showing a strip of film as it is fed to the machine;

Fig. 19 is a front view of the first cam from the left end of the machine as shown in Fig. 1, this cam operating the card feed mechanism;

Fig. 20 shows the second cam as viewed from the left in Fig. 1, this cam operating the card punching and compressing mechanism;

Figure 24:
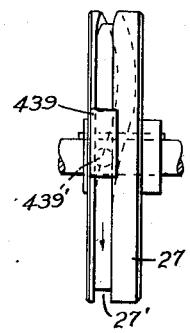
Figure 21:
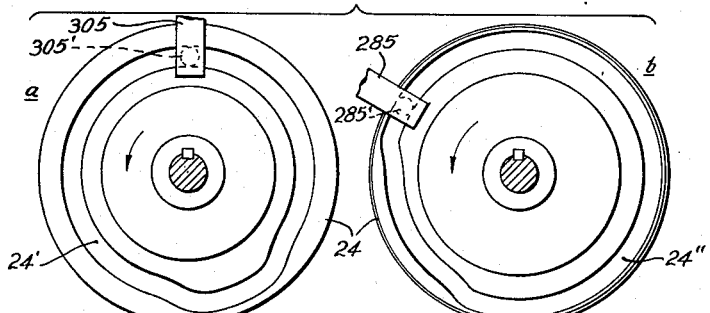
Figure 25:
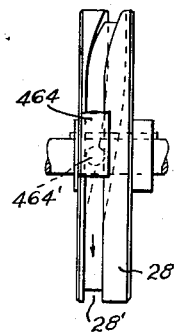
Figure 22:
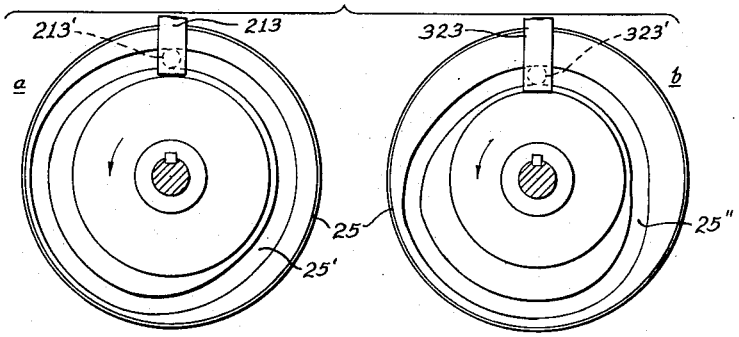
Figure 23:
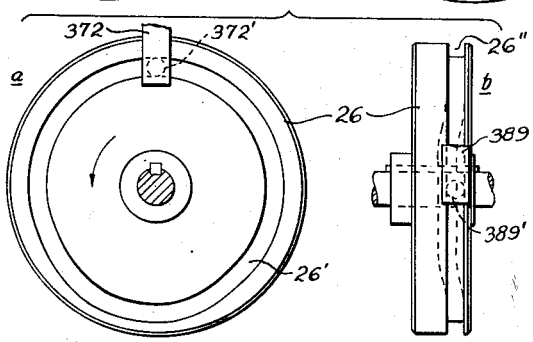

Figs. 21(a) and (b) show the two sides of the third cam of Fig. 1 which operate the pressure applying rocker for the adhesive material and the cutting knife for the adhesive material respectively;

Figs. 22(a) and (b) show the two sides of the fourth cam of Fig. 1 for operating the adhesive material feed mechanism and the adhesive material transfer mechanism;

Figs. 23(a) and (b) show the two sides of the fifth cam of Fig. 1 for operating the adhesive material punch and die;

Fig. 24 is a front view of the sixth cam of Fig. 1 for actuating the mechanism for applying the protective cover strip or film mechanism; and Fig. 25 is a front view of the seventh cam of Fig. 1 which operates the card stacking mechanism.

GENERAL DESCRIPTION

Referring to Fig. 1, the machine illustrated has a bed plate 1 which carries the operating parts of the mechanism, this bed plate having supporting frames 2 and 3 at its ends.

The mechanism is driven through the main drive shaft 4, supported in bearings 5 and 6 at the ends of the machine in brackets depending from the bed plate 1, by an electric motor 10 and sprocket 9 connected by the chain 8 with the sprocket on the drive shaft. The motor is controlled by a switch 10' on the bed plate. A hand wheel 12 is also fixed to the drive shaft to permit turning it by hand. This main shaft 4 drives the cam shaft 15 through pinion gear 18 on the drive shaft and spur gear 17 on the cam shaft. The cam shaft has bearings in the end brackets, one of which is indicated at 16. And a third intermediate bearing 19 is also provided for the cam shaft in a bracket depending from the bed plate.

Mounted on the cam shaft 15 are seven cams for operating the cam levers which in turn operate the various mechanisms, these cams being so positioned and timed as to carry out the sequence of operations which will be hereinafter described.

The bed plate 1 has a card feed trough 34 formed in its top surface extending from one end to the other and through which the cards are fed from the card feed hopper 30 (Fig. 1) through the various stations to the card stacking hopper 38. In the area of this card feed trough, and operating through openings in the bed plate, are the various punches and dies, etc. required for operating on the cards at the successive stages. And below this trough, and in front of the various punches and dies, are located two grooved slides 35 and 36 (shown in cross-section in Figs. 7 and 8) which extend from the left side of the machine of Fig. 1 to a position just short of the left side of the hopper 38 of Fig. 1, these slides, with other cooperating parts, hereinafter described, serving to feed the cards at spaced intervals to the successive stations. Cover plates 44 extend over the card feed trough and cover the cards between stations.

The various stations and operations of the machine include the following:

1. The card hopper indicated generally at 30 in Fig. 1 containing the cards which are to be fed intermittently and successively to the card feed trough 34;

2. The punch and compression unit indicated generally at 46 in Fig. 1 where an opening is punched in the card and a compressed portion is formed around the opening, this unit carrying a punch for punching the aperture and compression members for producing the depression around the aperture;

3. The adhesive material applying mechanism indicated generally at 50 and 51 in Fig. 1 where the roll of transparent pressure-sensitive material and protective coating such as glassine is supplied from a reel 55, the glassine separated from the adhesive material, and a section of the adhesive material cut out and applied to the card around the opening;

4. A punching unit having die mechanism for dieing out the central portion of the section of adhesive material in the opening and to leave a marginal edge of adhesive material extending into the opening, this unit being indicated generally at 66 in Fig. 1;

5. Feeding and applying mechanism indicated generally at 78 and 79 in Fig. 1 for feeding the glassine protective sheet or film and for cutting off sections thereof and applying them in the opening in the card against the pressure-sensitive material;

6. The card stacking hopper indicated generally at 38 in Fig. 1 where the finished cards are stacked.

In Fig. 3 is illustrated a card at its various stages. The blank card 31 is supplied to the feed hopper 30. The card after punching the opening 48 therein and forming the compressed portion or depression 49 therein at the punching and compression station is shown in Fig. 3(b). After the application of the adhesive sheet 53 the card 52 has the appearance indicated in Fig. 3(c). After cutting out the central portion of the adhesive material the resulting card 69 with the frame of adhesive material 70 overlapping the edge of the card and extending into the opening is shown in Fig. 3(d). The shape of the opening in the adhesive material may advantageously have a bowed edge at one section, as indicated at 71. The card 80 of Fig. 3(e) has a temporary and removable cover sheet 81 of glassine, etc. secured in the opening against the marginal rim of the pressure-sensitive adhesive material. And the card 89 of Fig. 3(f) has a section of microfilm or the like 90 similarly inserted in the opening against the pressure-sensitive adhesive material.

In the following more detailed description of the various operating parts and mechanism, each part will for convenience be separately described. But it will be understood that the successive parts of the machine are simultaneously operated through the common drive mechanism and cam shafts and connecting parts so that each station will perform its operations at the same or practically the same time and the cards will be fed successively and intermittently from one station to another so that each card will pass successively through the different stations while different cards are being operated on simultaneously at different stations.

Card feeding mechanism

The card feed trough 34, formed in the top surface of the bed plate 1, and extending from one end of the bed plate to the other, is slightly deeper than the thickness of the card and its width can be adjusted for cards of different widths by a thin bar 101 (Figs. 5 and 7), this bar serving as a guiding edge for the cards as they move through the trough from one station to the next. In this trough, as above described, are located the various punches and dies, etc. required for the successive operations. In front of the various punches and dies is located a groove 102 extending from the left or feed end of the machine (Fig. 1) into the left side of the hole in the bed plate under the stacking hopper 38. And in this groove 102 are located the card feed slides 35 and 36 which have laterally projecting edges 103 and 104 sliding in slots 105 and 106 formed in the side walls of the groove 102. (See Figs. 4, 5 and 7.)

Figure 19:
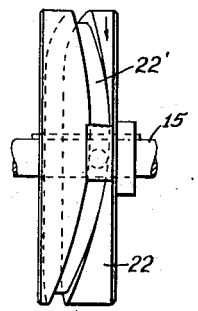
Figs. 19 to 25 show the seven cams mounted on the cam shaft for operating the different parts of the machine, with the approximate shapes of the cam paths indicated thereon.

The slides 35 and 36 are movably connected to each other by a series of card feed latches 37, four in number, only the first one of which is shown in Fig. 4. This latch is located in slots 108 and 109 in the slides 35 and 36. The latch 37 is pivoted to the slide 35 by a pin 107 and has a diagonal slot 111 in which a pin 110 carried by the lower slide 36 operates. The latch 37 also has an upwardly projecting card feeding lip 112. The lower slide 36 has a gear rack 39 which is reciprocated by a segment gear 40 carried by arm 41, pivotally mounted in bracket 42 and actuated by the first cam 22 through the adjustable coupling element 43 and the cam follower 43' operating in the cam path 22' (Fig. 19). The operation of the cam imparts reciprocating motion to the segment gear 40 and through it to the slides 36 and 35.

Referring to Fig. 4, as the lower slide 36 is moved to the right by the operation of the segment gear 40 the pin 110 on the slide 36 moves to the right of the diagonal slot 111 and causes the lefthand portion of the latch 37 to pivot upwardly about the pin 107 on the upper slide 35, to the position shown in full lines in Fig. 4, thus raising the lip 112. Continued forward movement will cause the slides 36 and 35 to move together and will cause the projecting lip 112 to engage the left or trailing end of the card and move it to its successive station. When the spur gear segment 40 is reciprocated in the opposite direction, the lower slide 36 will first be moved to the left (Fig. 4) and the movement of the pin 110 in the diagonal slot 111 will cause the lefthand end of the latch 37 to be lowered to the position shown in dotted lines and the slides and latch will then move together back to the initial position. During this backward movement the projecting lip 112 will be lowered below the bottom of the card feed trough 34 and without contact of the latch with the card.

Four latches 37 such as illustrated in Fig. 4 are spaced apart along the slides 35 and 36 and the length of the stroke of the segment gear 40 is predetermined and adjusted to move each card through the trough 34 from one operating position to the next. The other latches are not shown in the drawing except for a portion of the last latch 37 in Fig. 1.

The feeding device for feeding the blank cards from the feed hopper 38 includes a picker plate 32 secured to the lefthand end of the slide 35 as shown in Figs. 4, 6 and 6(a). This plate 32 is cut away at its right end as indicated at 113 to provide two tongues 114 and 115 with inclined ramp portions 116 and 117 and has card feed picker members 118 and 119 secured thereto and projecting slightly above the upper surface of the plate 32 and having their forward edges or lips 118' and 119' extending upwardly for a sufficient distance to engage the rear edge of a single card 31 as the plate 32 is moved to the right by the action of the card feed slides 35 and 36. The plate 32 has a lateral guide fin 120 sliding in a corresponding groove (not shown) formed in the bed plate 1. The inclined portions of the picker ramps 116 and 117 serve to raise and guide the back end of the lowermost card in the hopper 38 into engagement with the lips 118' and 119' of the pickers and assist in preventing more than one card at a time from being engaged by the pickers.

The card feed hopper 38 has end plates 126 and 127 and side plates 128 and 129 connected and supported by corner angle members 130 carried by brackets 131 on the bed plate 1. The right hand end plate 126 has a mounting plate 125 which carries an upper throat member 122 which forms the upper member of a throat through which the cards pass and which is so located as to prevent more than one card passing therethrough at a time. This throat is located between the upper member 122 and the throat block 121 which is located in a recess formed in the bed plate below the card feed trough 34 and is positioned in approximately the center thereof with its top surface flush with the bottom of the trough. The upper portion of block 121 is provided with small holes 123 which communicate through suitable ducts with a vacuum conduit 124 extending downwardly through the bed plate and connected with the vacuum pump 63 (see Fig. 1). Suction is constantly applied through the holes 123 so that, as a card is pushed through the throat and slides over the block 121, it is held against this block and away from the upper member 122 so that, even though the cards may be slightly buckled or warped, the cards will be held flat as they enter and pass through this throat. The upper throat member 122 is adjustable to vary the thickness of the throat to insure that only one card passes through at a time.

*Card punching and compressing mechanism*

The cutting and compression mechanism 46 for punching the opening 48 in the card and for forming the compressed margin 49 around the edges of the opening (Fig. 3b) is shown in perspective in Fig. 1 and in vertical transverse section in Fig. 7.

Mounted underneath the bed plate 1 is the block 140 supported by bolts 141 which extend therethrough from the upper frame member 142. The forward end of the block 140 (at the left in Fig. 7) supports the die block 143, which extends up through an opening in the bed plate and has its top surface even with the bottom of the card trough 34. The block 140 has an opening 146 below the die opening 145 in the die block; and a suitable chute is shown at 147 for carrying away the punched out portions of the cards.

Above the bed plate 1 the punch and compression unit 46 has a bottom plate member 150 mounted thereon, two side plate members 151 and 152 and a back plate member 153 mounted on the bottom plate, and a top frame member 142, these members enclosing the punch and compression elements 170 and 45, respectively, except at the front and being held together by the bolts 141 extending from the top frame member 142 to the block 140.

Figure 20:
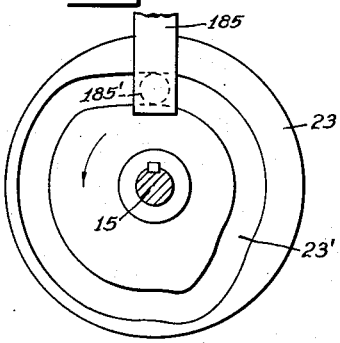

The elements 45, 170 of the punch and compression unit 46 are mounted in a vertically slidable block 168 which is actuated through the vertical toggle 162 and horizontal toggle 173 by the cam 23. The vertical toggle is made up of upper and lower links 163 and 166 pivoted together at 165, with the upper link pivoted at 164 to the vertically adjustable block 154 and with the lower link pivoted at 167 to the vertically slidable block 168. The vertical toggle is connected through link 174 with the horizontal toggle, this link being pivoted to the vertical toggle at 165 and to one arm of the horizontal toggle at 176. This pivot 176 is a shaft mounted in the horizontal slide member 176'. The horizontal toggle is made up of links 175 and 177 pivoted together at 181, with the link 175 pivotally connected to the connecting link 174 and with the link 177 pivotally connected at 178 with the stationary block 179 carried by the back plate member 153. The horizontal toggle is pivotally connected at 181 with a connecting element made up of upper and lower members 180 and 183 and the adjustable coupling member 182, the lower member being pivoted at 184 to the vertically reciprocating cam slide 185 moving between guides 186 depending from the bed plate 1 and actuated by cam 23 through cam follower 185' (Fig. 20) travelling in the cam path 23'.

The upper supporting block 154 for the vertical toggle is vertically adjustable. It is supported from the top plate 142 by the bolt 155 which passes through a slot 156 in the wedge block 157 which is movable and adjustable laterally by the stud bolt 158 which extends through the back plate 153 and has the collar 159 thereon. By loosening the bolt 155 and turning the stud bolt 158 the wedge block 157 can be moved forward or backward with respect to the block 154 so that the latter can be adjusted vertically and held in adjusted position on tightening the bolt 155.

The support block 168 slides in grooves formed in the side plates 151 and 152 in which gibs 172 (Fig. 1) are provided for accurately centering the support block and insuring that the punch carried thereby is accurately positioned, these gibs being adjustable (by means not shown) to insure such accurate positioning of the die punch.

The removable cutting punch or die 170 is carried by the member 45 and removably secured thereto by the set bolt 171. The member 45 is in turn removably mounted in the block 168 and held therein by the set bolt 169. The punch 170 is located above the opening 145 in the die block 143 and is of corresponding size. The carrier block 45 is somewhat larger than the punch 170 so that a surrounding shoulder portion 45' is provided on the bottom of the carrier block.

Fig. 7 shows the cutting and compressing elements 170, 45 in raised position before the opening 48 and depression or shoulder 49 are formed in the card 47. When the cutting and compressing mechanism is actuated by the cam 23 and the toggles 162, 173 are moved to the position shown in dotted lines in Fig. 7, the downward movement of the punch 170 cuts out the opening 48 in the card (Fig. 3b) and the further downward movement causes the shoulder 45' to press the edge of the card around the opening and form the shoulder or depression 49 (Fig. 3b). The amount of compression which will be applied to the card to produce the depression around the edge of the aperture may be regulated by adjusting the upper vertically adjustable block 154 as above described and also by adjusting the adjustable coupler 182 which connects the members 180 and 183.

The size and shape of the opening 48 in the card 47 can be varied by varying the shape and size of the punch member 170 and of the die opening 145 in the die block 143. The size and depth of the depression or shoulder 49 in the card around the opening can also be varied by varying the shoulder 45' on the block 45 and by adjusting the mechanism as above described to vary the amount of compression. With the hard classification cards of the order of 0.007 inch in thickness, a pressure of several thousand pounds per square inch is usually necessary to form a depression of e. g. 0.001 inch or thereabouts. In case it is desired to form an opening in the card without forming a shoulder or depression around the opening, the shoulder 45' can be omitted or the sliding block 154 can be adjusted upwardly so that the shoulder 45' does not compress the card when the punch member 170 moves downwardly to cut the opening in the card.

*Adhesive material feeding, separating, cutting and applying mechanism*

The next station to which the card is moved, after the punching of the opening 48 and the forming of the depression 49 therein, is the station at which a piece or patch of pressure-sensitive adhesive material is applied to the card over and around the opening to form the card 52 shown in Fig. 3c, having the patch of adhesive material 53 covering the opening and with its edges in the depression around the opening.

The mechanism for supplying, cutting and applying the adhesive material is indicated generally by the parts 50 and 51 in Fig. 1 and further illustrated in Figs. 8 to 13. The feeding, separating and applying units are indicated generally at 50 and the cutting unit for cutting the adhesive material at 51.

The adhesive material illustrated is thin, transparent, pressure-sensitive adhesive of around 0.001 inch thick, made of cellophane or other transparent sheet material having a slow-acting pressure-sensitive coating of transparent material on one side thereof. This material is commonly supplied in rolls with the adhesive side of the sheet covered by a removable cover sheet, e. g., of glassine paper. Such pressure-sensitive adhesive materials are marketed under the trade names "Clearseal" and "Duroseal," for example.

Referring to Fig. 1, a roll of such adhesive material is shown as carried by the reel 55 supported by the member 197 and from this roll the two-layer, covered adhesive tape or strip 54 is fed around the guide roll 198 and through a trough 56 and passes between the lower vacuum roll 57 and the glassine stripper roll 58 where separation of the adhesive material from the glassine cover sheet takes place. These rolls are rotated intermittently, and vacuum is applied to a portion of the vacuum roll 57, as hereafter described, to hold the adhesive material. The glassine paper removed from the adhesive material passes upwardly over the roll 58 and between it and the roll 59. Where this glassine is to be subsequently applied to the openings in the cards, at a later stage of operation, as illustrated in Fig. 1, this separated glassine sheet 60 passes over the quarter turn roll 64 and then over the roll 74 to the station where it is to be further used.

The adhesive strip 61, after separation from the glassine cover strip 60, passes down around part of the vacuum roll 57 and down through the opening 254 (Fig. 8), where it is held against the guide plate 255 by a blast of air from the jet 256. A predetermined length of this adhesive material 61 is cut off by the knife 262 (Fig. 8) and held by vacuum against the member 290 (Fig. 8). And while so held the rotation of this member to the position shown in Fig. 11 transfers the cut off portion of adhesive material to a position where it can be applied to and pressed down on the card around the opening.

The feeding, separating, cutting, transferring and applying operations are so timed that a patch of adhesive material will be ready to apply to each card as it is successively brought into position for such application. In this position, as shown in Figs. 8 and 11, the card 52 has its opening positioned above the opening 190 in the support block 191 which is mounted in an opening in the bed plate 1, the top of which, 192, is even with the bottom of the card trough 34.

Most of the mechanism for applying the adhesive material is supported by or located within a box-like support frame with side plate members 193 and 194 having flanges 195 and 196 mounted on the bed plate 1. An upwardly extending arm 199 has the idler guide roll 198 mounted therein; and the upwardly extending arm 197 supports the adhesive supply reel 55. The trough 56 is supported by the inclined top plate 200 of a box-like support frame.

The vacuum roll 57 is keyed to the shaft 201 supported in bearings 202 and 203 in the side plates 193, 194. A spur gear 204 is also fixed to the shaft 201, adjacent the vacuum roll. A roller clutch 205 having a spur gear 206 is also mounted on the shaft 201, this spur gear engaging with the segment gear 208 of the lever 207 pivoted at 209 and the other end of which is connected with the cam 25. The arrangement is such that as the spur gear segment 208 moves upwardly and downwardly, by the action of the cam, the spur gear 206 will cause the vacuum roll to rotate intermittently, the roller clutch 205 causing the roll to move with the spur gear in one direction but not in the other. Also mounted on the shaft 201, but not keyed thereto, is the spur gear 315 which meshes with the segment gear 318 of the arm 317 pivoted at 209 and the other end of which is connected to the cam 25. The gear 315 also meshes with segment gear 314 of the adhesive patch transfer and pressure applying mechanism hereafter described.

The connection between the lever 207 and the cam 25 includes an adjustable sliding member 210 (of similar construction to the slide 409 of Figs. 16, 18 and 1) pivoted to the connecting rod 211 which in turn is connected through an adjustable coupler 212 to a connecting rod (not shown) which in turn is pivotally connected to the cam slide 213 (Fig. 22a). This connection to the cam slide is similar to that illustrated in Fig. 7 and that indicated for the cam slide 323 shown at the bottom of Fig. 8 for the front of the cam, the cam slide 213 being on the back of the cam as shown in Fig. 8. The slide 213 has a cam follower 213′ actuated by the cam path 25′ (Fig. 22a), so that the arm 207 will be rotated back and forth around its pivot 209.

Figure 16:
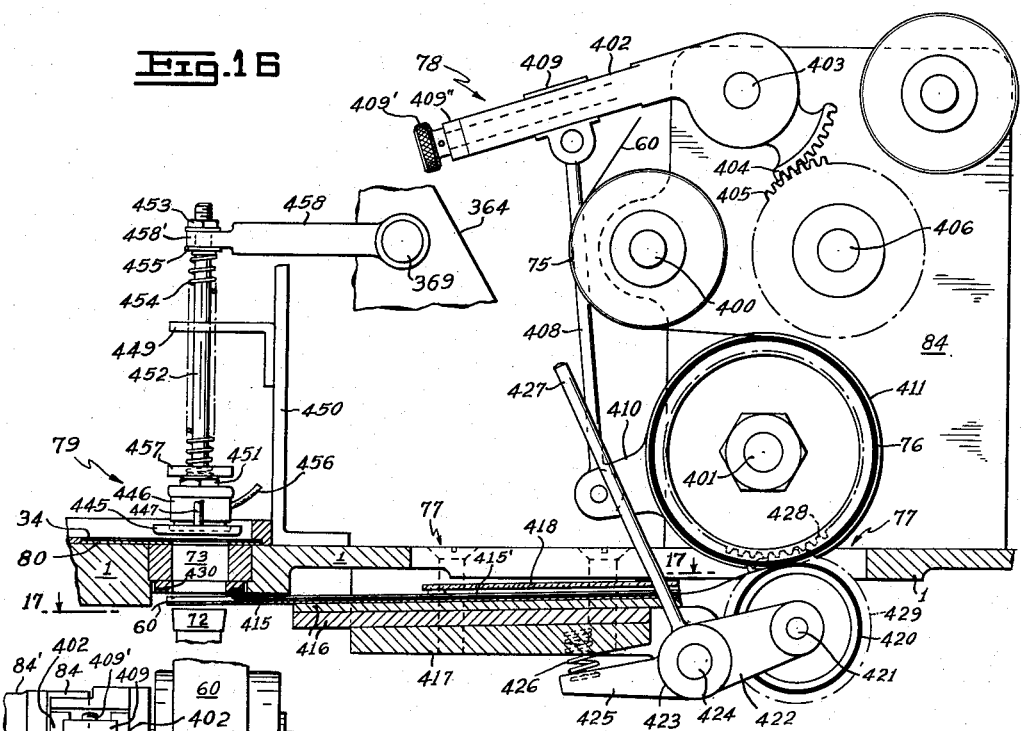
Fig. 16 is a transverse elevational view partly in section taken approximately along the line 16—16 of Fig. 1 and showing the mechanism for supplying the protective cover sheet or the microfilm, etc.

The righthand end 207′ of the reciprocating lever 207 has a segment gear 298′ thereon which meshes with the spur gear 497 on the shaft 406, which actuates part of the mechanism shown in Fig. 16, this shaft 406 extending from the adhesive material applying unit 50 to the protective sheet or film applying unit 78.

The glassine stripper roll 58 is rubber covered and fixed to the shaft 215 mounted in bearings 216 and 217 in the two arms 218 and 219 of a support member 220 pivotally mounted on shaft 222 supported in bearings 223 and 224 in the side frame members 193, 194. The upper portions of arms 218 and 219 have open bearing slots in which the shaft 225 of the rubber covered separating roll 59 is mounted. The gear 221 on the shaft 215 meshes with the gear 204 fixed on the vacuum roll shaft 201 and also with the gear 226 of the separating roll 59. The arrangement of these gears is such that as the vacuum roll 57 rotates intermittently in a counterclockwise direction in Fig. 8 the rubber covered roll 58 rotates in a clockwise direction and the roll 59 in a counterclockwise direction. The teeth of the gears connecting these rolls have a depth such that the rubber covered rolls will normally press against each other and the lower rubber covered roll will press against the vacuum roll.

The righthand end of the pivotally mounted support member 220 (Fig. 8) has an arm 227, the under surface of which has a recess 228 for receiving a spring 229, the lower end of which is seated in a cup 230 affixed to the upper frame member 200. A hand lever 231 is connected to the shaft 222 to permit rotating the member 220 around the shaft 222 when it is desired to raise the roll 58 to insert the double layer of adhesive and protective material between this roll and the vacuum roll 57. The action of the spring 229 together with the weight of the rolls 59 and 58 holds roll 58 in engagement with the vacuum roll 57 in normal operation. The pressure of these rolls insures that the composite sheet of adhesive and protective material will be moved forward intermittently and to a predetermined extent as the rolls are intermittently rotated, while the separated glassine material will be similarly carried between the rolls 58 and 59.

The guide roll 64 over which the glassine sheet 60 passes after it leaves the rolls 58 and 59 is supported by a bracket 235 adjustably mounted on the shaft 236 carried by the holder 237, carried by rod 239 held by clamp 238 secured to the side frame member 193.

The vacuum roll 57 is provided with numerous small suction holes 240 through which suction is applied to the smooth outer surface of the adhesive sheet. As shown in Fig. 9, each series of holes 240, drilled in the periphery of the roll 57, terminates in a common duct 241. One end of this duct is closed within the roll and the other end terminates in the left face of the roll as shown in Fig. 9. A stationary vacuum block 242 has an arcuate groove 243 formed in the face thereof adjacent the roll 57, and a hole 244 leading from this arcuate groove, as shown in Fig. 9, which is connected through nipple 245 with a suction hose 62 connected with the vacuum pump 63 (Fig. 1). As shown in Fig. 8, the arcuate groove 243 is of such length and is so located within the vacuum block 242 that, for any given position of the roll 57, only those ducts 241 which are in the upper forward segment of the roll communicate with this groove. A vacuum or suction is thus constantly applied through certain of the holes 240 to the back of the adhesive strip 61 as the rolls 57 and 58 feed the composite strip 60, 61 between them. The protective sheet 60 of glassine is removed and carried away around the rubber covered roll 58 while the adhesive material 61 is held against the vacuum roll to insure that it is separated from the protective sheet.

In the operation of the adhesive feeding and separating material thus described the rotation of the cam shaft 15 and cam 25 will cause the lever 207 to reciprocate first in one direction and then the other, causing the spur gear 206 and roller clutch 205 to rotate the vacuum roll 57 to a predetermined extent in one direction while the roller clutch prevents this roll from being rotated in the other direction. The length of adhesive sheet which is fed by this reciprocating motion can be adjusted by adjusting the location of the member 210 on the lever 207.

When the adhesive sheet 61 has passed down below the lower end of the arcuate suction groove 243 it is no longer held against the vacuum roll 57 but falls freely therefrom down into the opening 254 where sections are cut off and applied to the card by the cutting mechanism.

The adhesive sheet 61 passes down over the guide 255 affixed to the plate 252 at the rear of opening 254, this guide being shaped to cooperate with the stream of air under pressure directed onto the exposed surface of the adhesive material from the air nozzle 256 supplied with compressed air through hose 257 from a supply of compressed air not shown.

*Adhesive cutting mechanism*

Located in front of the separating mechanism 50 above described is the cutting unit 51, best shown in Figs. 1 and 8. This unit has a box-like frame within which the cutting mechanism is located, this frame including side plates 250 and 251, top plate 252 and bottom plate 253, this structure being mounted on the bed plate 1 below and in front of the vacuum roll 57, with the adhesive sheet passing down through the opening 254 in the cover plate 252.

Located within this box-like structure is a supporting member 260 having grooves in which the knife carrying plate 261 is slidably fitted, this plate having the knife blade 262 secured to its forward end and adapted to cooperate with a knife blade 262' secured to the under surface of the cover plate 252 back of the opening 254.

The front end of the knife carrying plate 261 (the lefthand end in Fig. 8) has a depending portion or lip 261' which is adapted to be engaged by the catch 263 keyed to the shaft 264 journalled in bearings 265 and 266 (see Fig. 1). The rear end of the plate 261 (at the right in Fig. 8) has a downwardly extending portion or lip 261'' against which a compression spring 267 bears. One end of this spring is fitted over a pin 269 on the lip 261'' and the other end is seated in a recess formed in the block 268. The knife plate 261 is normally held in the position shown in Fig. 8 by the catch 263 but when this catch is released, the spring 267 causes the plate 261 and knife 262 to move to the right and cut off a section of adhesive material.

The shaft 264 to which the arm 263 is keyed, has a rearwardly extending arm 270 with an opening therein through which a rod 272 passes, this rod having a collar 273 which in the position shown in Fig. 8 is held in engagement with the arm 270.

A bell crank lever 275 is mounted on shaft 278 and has a forwardly extending arm 276 extending to a position just below the lock nut 279 on the rod 272. The lever 275 also has a downwardly extending arm 277 with a pin over which one end of a compression spring 280 extends, the other end being seated in a recess formed in the block 281 secured to the plate 253. This lower arm 277 also has a ledge or projecting portion 277' which in the position shown in Fig. 8 engages the underside 270' of the arm 270.

The lower end of the rod 272 is pivotally connected with one arm 282 of a bell crank lever mounted in the bracket 283 and having a rod 284 leading to a cam slide 285 (Fig. 21b) which has a cam follower 285' in the cam path 24'' of the cam 24.

When a predetermined length of the adhesive strip 61 has been fed downwardly through the opening 254 and past the knife blades 262, 262', the lower portion thereof is drawn onto the rotatable suction plate 289 (hereafter described) and is held thereon.

The construction and operation of the cutting mechanism is such that, as the operating cam 24 revolves, the rod 272 will be moved downwardly until the lock nut 279 acts on the arm 276, causing the lever 275 to rotate in a counterclockwise direction against the pressure of the spring 280. When the arm 277 has been moved to the right (Fig. 8) to a sufficient extent the ledge 277' suddenly releases the arm 270 so that the catch 263 is no longer held in the position shown in Fig. 8. When this occurs the spring 267 will cause the knife carrying plate 261 and the knife blade 262 to move suddenly to the right to bring the knife blade 262 into cutting engagement with the knife blade 262' thus cutting off a portion of the adhesive strip 61 which is then held on the suction plate 289.

Thereafter as the cam 24 rotates the rod 272 is moved upwardly to the position shown in Fig. 8 and returns the knife blade carrier 261 to the position shown in Fig. 8 and returns the other parts of the apparatus to the positions there shown.

*Adhesive patch transfer and pressure applying mechanism*

As best shown in Figs. 8 and 9, the suction plate 289 is carried by a block 290 mounted on an arm 291 which is keyed to a shaft 292. This shaft has bearings 293 and 294 in the arms 295 and 296 of a rocker lever 297 (see also Fig. 10). This lever is mounted on shaft 298 supported by the side plates 192 and 193 and has a rearwardly extending arm 299 which is pivotally connected at 299' to a block 300 slidably mounted on the rod 301, the lower end of which is pivotally connected to a cam slide 305 (Figs. 11 and 21a) the cam follower 305' of which is seated in the cam path 24' of the cam 24. A compression spring 306 around the rod 301 is supported at its lower end by washer 308 and lock nuts 309 and 310. This spring forces the block 300 up against the washer 302 and lock nuts 303 and 304.

The shaft 292 which carries the vacuum support arm 291 also has the segment gear 314 keyed thereto and this gear normally engages the spur gear 315 which is freely mounted on the shaft 201 and which is in turn actuated by the spur gear segment 316 of the lever 317 pivotally supported by the shaft 209 and connected at its other end through an adjustable coupling 319 (of similar construction to the slide 409 of Figs. 16, 18 and 1) with the rod 320 connected through the adjustable coupler 321 to the rod 322 which is pivotally connected with the cam slide 323, having cam follower 323' (Figs. 8 and 22b) seated in the cam path 25'' of the cam 25.

The arrangement is such that as the segment gear 316 moves downwardly from the position shown in Fig. 8 to that shown in Fig. 11, it will rotate the gear 315 and through it the segment gear 314 to the position shown in Fig. 11. Thereafter the action of the cam 24 will cause the lever 297 to move from the position shown in full lines to those shown in dotted lines in Fig. 11, forcing the patch of adhesive material down onto the card. The spring 306 insures that the pressure will be yieldably applied without injury to the card while still insuring that the adhesive patch will be firmly pressed against the card. After this has been applied the further rotation of the cam 24 will cause the lever 297 to pivot in the opposite direction, bringing the teeth of the segment gear 314 back into engagement with the teeth of the gear 315 after which the upward movement of the spur gear segment 316 will return the parts to the position shown in Fig. 8.

To insure accurate centering of the adhesive patch in the depression 49 in the card around the opening 48, guide lugs 325 formed on the arm 291 are engaged by and slide vertically downward in the grooves 326 formed in the block 327 which extends over the cover plate 44 at this location and is secured to the bedplate 1. This block 327 is cut away to provide an opening through which the vacuum arm 291, block 290, and plate 289 pass as they rotate and move downwardly from the position shown in Fig. 8 to the position shown in Fig. 11. Portions of block 327 are also cut away as indicated at 327' to permit the lugs 325 to move into position over the tops of the grooves 326. The engagement of the guide lugs 325 in the grooves 326 prevents rotation of the shaft 292 when the segment gear 314 is disengaged from the gear 315 as the adhesive patch is carried downwardly and applied to the card.

After the adhesive patch has been firmly pressed down onto the card over the aperture, and while the plate 289 is still in this pressure-applying position, the suction by means of which the patch was held on the plate is released, so that the suction plate 289 and arm 291 can be moved upwardly to bring the gear segment 314 into engagement with the gear 315. This upward movement disengages the guide lugs 325 from the grooves 326 and the parts can then be returned by further operation of the cam 25 and connected parts to the position shown in Fig. 8.

The vacuum mechanism by which the adhesive patch is held on the vacuum plate 289 is illustrated in Fig. 9. The shaft 292 is provided with a central axial opening extending from the left end thereof to near the central portion thereof and a hollow tube 330 is fitted within this opening and has a flange 331 at its left end (Fig. 9) which is held in place by bolts 333 extending through openings therein into the bearing 294 and having springs 334 between their heads and the outer face of the flange 331. A packing ring 332 is arranged around the tube 330 between the lefthand end of the shaft 292 and the inner face of the flange 331, the springs 334 maintaining a tight fit between this packing 332 and the inner face of the flange. A nipple 335 is connected to the outer end of the tube 330 and is in turn connected by the hose 336 to a nipple 357 threaded onto the delivery flange 343 of the vacuum distributor unit 345 shown in Figs. 12 and 13. This unit, subsequently described, supplies suction or vacuum intermittently to the tube 330.

Referring to Fig. 8, the axial opening in the tube 330 in the shaft 292 is connected through a radial passage 337 to a passage 338 in the arm 291 and a passage 339 in the block 290 to a suction chamber 340 formed in the block 290 (Figs. 8 and 9). Plate 289 is drilled with spaced holes 341 which communicate with the chamber 340 so that suction is applied through these holes to the adhesive strip to hold it on the suction plate while suction is being applied, releasing it when the suction is released.

As shown in Fig. 1 the vacuum distributor unit 345 is located on the left end of the cam shaft 15. Referring to Figs. 12 and 13 the vacuum distribution disc 346 is keyed to the end of the cam shaft 15. The flange member 348 is secured to the bracket and held in a stationary position and a further flange member 347 is also secured to the flange member 348 by bolts 358, the arrangement being such that the rotating vacuum distributor disc 346 rotates between the stationary flange members 347 and 348. An oil ring 348' is provided for lubricating the shaft 15.

The flange 347 has an opening 349 therethrough to which the nipple 350 is threaded, this nipple connecting through the hose 351 to the vacuum pump 63 (see Fig. 1). The rotating disc 346 has a shallow arcuate slot 352 formed in the left face thereof (Figs. 12 and 13) and a correspondingly located shallow arcuate slot 353 formed in the right face thereof. Two holes 354 and 355 are drilled through the rotating disc 346 and connect the slots 352 and 353. The flange 348 has a passage 356 therein extending from the inner or left face (Fig. 13) to the periphery thereof and the nipple 357 is threaded into the outer end of this passage to which the hose 336 is connected, this hose leading to the vacuum plate 289 as indicated in Figs. 1 and 9. The faces of the rotating disc 346 and the inner adjacent faces of the flanges 347 and 348 are machined to give a close fit.

Vacuum or suction is continuously applied to the passage 349. As the disc 346 rotates to bring the slot 352 into registry with this opening 349 and simultaneously to bring slot 353 into registry with passage 356, suction will be communicated through the slot 352, the holes 354 and 355 and the slot 353 to the passage 356 and thence through the hose 336 to the tube 330 and to the suction plate 289 to hold the adhesive strip 61 against this suction plate. This suction is applied when the adhesive patch is cut off by the cutting knife and is continued while the vacuum plate carrying the adhesive patch is moved from the position shown in Fig. 8 to that shown in Fig. 11 and applied to the card and pressed down onto the card. At this point in the cycle the disc 346 has rotated so that the slots 352 and 353 have moved past the position in which they are in registry with the passages 349 and 356, thus interrupting and releasing the suction so that the adhesive patch is no longer held against the vacuum plate 289. Thereafter the suction plate is raised and returned to the position shown in Fig. 8 and the adhesive strip 61 is moved downwardly until another length is brought opposite the suction plate 289 when suction is again applied, another patch cut off, and the operation is repeated.

In the operation of the machine these various operations take place successively and automatically and in timed relation.

*Adhesive patch punch and die mechanism*

After the application of the adhesive patch to the card, the card 52 with adhesive patch 53 thereon (Fig. 3c) is moved by the card feeding mechanism to the next station indicated generally at 66 in Fig. 1 where the central portion of the adhesive patch is punched out by the punch members 65 and 67 to form the card 69 shown in Fig. 3d, with the marginal section of adhesive material 70. The punch and die mechanism is shown in perspective and with parts cut away in Fig. 1 and shown in more detail in Figs. 14 and 15. The shape of the male and female die members 65 and 67 is such that the opening in the adhesive patch is generally rectangular in shape and may have a bowed portion 71 on one side as illustrated in Fig. 3d.

The portion of the mechanism located above the bed plate 1 is supported in a support frame having side members 364 and 365 and upper transverse member 366 and within this frame is located the slide 361, which is slidably mounted between the front flanges of the side members of the frame and the gibs 362 and 363. The center of the slide 361 is cut away and a shaft 367 is mounted between the two sides of the slide and is reciprocated by the lever 368, the left end of which (Fig. 15) is pivotally connected with the shaft 367. This lever is pivotally mounted on the shaft 369 which has bearings in the side plates 364, 365 of the frame member and the other end of this lever 368' is connected to the block 370 which is slidably and adjustably mounted on the rod 371, the lower end of which is pivotally connected to the slide 372 having a cam follower 372' located in the cam path 26' of the cam 26 (see also Fig. 23a). The block 370 is a spring loaded block of the same construction as the block 390 previously described in connection with Figs. 8 and 11.

The slide 361 has the punch member 65 mounted therein and held by set screw 360. To the bottom of the slide 361 is also attached the stripper plate 375, mounted on pins 376 and 377 which extend up through holes in the bottom of the slide member 361 and are secured to a plate 378. A compression spring 379 is located between the plate 378 and the underside of a support plate 382 mounted between the sides of the slide member, the ends of this spring being seated over and secured to the studs 380 and 381. The stripper plate 375 is mounted and supported so that its bottom surface is normally located somewhat below the cutting face of the punch 65, as shown in Fig. 14. The plate 375 and the lower portion of the pins 376 and 377 are omitted in Fig. 1 to permit showing of the relation of the die members 65 and 67.

The female die member 67 is carried by a die carrier 385 slidably mounted on pins 386 and 387 suspended from the mounting block 383 mounted in an opening in the bed plate 1 and secured thereto by bolts 384. The female die member 67 is mounted on the top of the carrier member 385 and slides in an opening in the block 383. This die member 67 has a raised rim 67' which extends upwardly a distance corresponding to the thickness of the card and the size of the opening in this die member corresponds to that of the punch member 65 of the die.

The lower end of the die carrier 385 is pivotally connected to the link 68 which in turn is pivotally connected to one arm of a bell crank lever 388, pivotally supported by the bracket 389 depending from the bed plate 1. The other arm of lever 389 is attached to a cam link 390 with the cam follower 390' seated in the cam path 26'' of the cam 26 (see also Fig. 23b).

As the cam 26 on the cam shaft 15 revolves the die carrier 385 is reciprocated vertically on the pins 386 and 387 by means of the links and levers just described. As the die carrier moves to its uppermost vertical position the female die member 67 will be brought up under the card so that it is positioned just beneath and around the opening in the card and the patch 53 of adhesive material applied to the card over the opening. The raised rim 67' extends up into the opening in the card and into direct contact with the under-adhesive surface of the adhesive patch, while the outer portions of the die member 67 come into contact with and support the card around the opening. This movement of the die member 67 to the position just described is timed to occur after the card with the adhesive patch applied thereto has been moved to the proper position with respect to this die member by means of one of the card feed latches 37 previously described.

Simultaneously with the movement of the lower die member 67 the upper punch member 65 is moved downwardly by the action of the cam 26 and connecting rods and levers which cause the slide member 361 to move downwardly. During this downward movement the stripper plate 375 also moves downwardly and comes into engagement with the upper smooth surface of the adhesive material and card before the punch 65 does so. This stripper plate firmly presses the marginal portion of the adhesive material affixed to the card down on the card against the backing pressure of the female die 67 and also presses the marginal portion of the adhesive material which will remain in the aperture after the punching operation against the raised rim 67', the spring 379 augmenting the pressure with which the stripper plate is pressed against the card and adhesive material. Continued downward movement of the slide 361 causes the punch 65 to pass through the female die 67 and cut out the center portion of the adhesive patch, which center portion is pushed down into the opening below the die and passes to a container (not shown).

After this punching operation, the further operation of the cam 26 and levers connected with the slide 361 causes the punch 65 to be withdrawn from the female die member 67 while the stripper plate 375 remains in contact with the adhesive material and card until this punch has moved upwardly through the hole just cut in the adhesive material, and then moves the stripper plate and punch upwardly away from the card to the position shown in Fig. 14. At the same time the movement of the cam 26 and connecting levers causes the die carrier 385 to move downwardly to lower the raised rim portion 67' of the die member 67 and separate it from the adhesive surface and from the opening in the card so that the card may be moved by one of the feed latches 37 to the next station.

The male and female die members 65 and 67 are removable and replaceable to form openings in the adhesive patch of the desired size, the opening shown in the card 69 of Fig. 3d being generally rectangular but having a bowed or tapered or notched portion 71 on one side to facilitate removal of a protective cover sheet of glassine where this is to be subsequently inserted in the opening against the pressure-sensitive adhesive as temporary protection. If a film section is to be mounted in the opening in the card against the margin of pressure-sensitive adhesive the shape of the opening in the adhesive patch may be square or rectangular without such modification.

Feeding mechanism for cover layer strip or film strip

After the opening has been punched in the adhesive patch the card is moved to the next station where a protective cover sheet of glassine or the like or a film section is introduced into the opening in the card against the adhesive surface of the pressure-sensitive adhesive patch. This station is indicated generally at 78 and 79 in Fig. 1 and the mechanism is shown in greater detail in Figs. 16 and 18.

A somewhat different arrangement of feeding mechanism is used when a protective sheet of glassine is to be inserted in the opening in the card than when a microfilm section is to be so inserted. Referring to Fig. 1, it will be noted that the support member 83, supported by rod 83' from bracket 84' has a holder 82 for supporting the guide roll 74 so that the strip 60 of glassine, separated from the pressure-sensitive adhesive strip 61, can be passed over the roll 74 and supplied to the units 78 and 79. This arrangement provides for using the same glassine strip which has been separated from the strip of pressure sensitive adhesive for supplying glassine cover sheets for inserting in the openings in the cards as a protective coating.

Referring to Fig. 2, it will be noted that the bracket 83 has a shaft 86 secured thereto on which a roll 85 of microfilm or the like 87 is mounted. When the protective cover sheet of glassine is not to be inserted in the openings in the cards, and when instead a section of film is to be inserted, the roller 74 will be removed and the film support shaft 86 inserted in the bracket 83. Whether the protective cover sheet or film is to be used, the operation is much the same, except in respects hereafter pointed out.

The strip of glassine 60 or the strip of microfilm 87 passes down over an idler roll 75 (Figs. 1 and 16) and then around the back side of the rubber covered roll 76 and between the bottom portion of this roll and the top portion of the rubber covered roll 420 (Fig. 16). The idler roll 75 is mounted on a shaft 400 and the rubber covered roll 76 is keyed to the shaft 401 having bearings supported by the bracket 84 attached to the upper surface of the bedplate 1.

Also mounted on the bracket or support member 84 is a shaft 403 carrying lever 402, the rear or righthand end of which has a segment gear 404 which engages a spur gear 405 fixed to the shaft 406. This shaft 406, as shown in Fig. 1, extends to the adhesive strip feeding, patch cutting and applying mechanism 50, 51 shown in Fig. 8, and is operated by the cam 25 and connecting mechanism described in connection with Fig. 8, this shaft 406 also having the spur gear 407 thereon engaging with the segment gear 208' of the lever 207 shown in Fig. 8.

The lever 402 is pivotally connected to a rod 408, the lower end of which is pivotally connected to an arm 410 of a roller clutch 411 mounted on the shaft 401 on which the rubber covered roll 76 is mounted.

Figure 18:
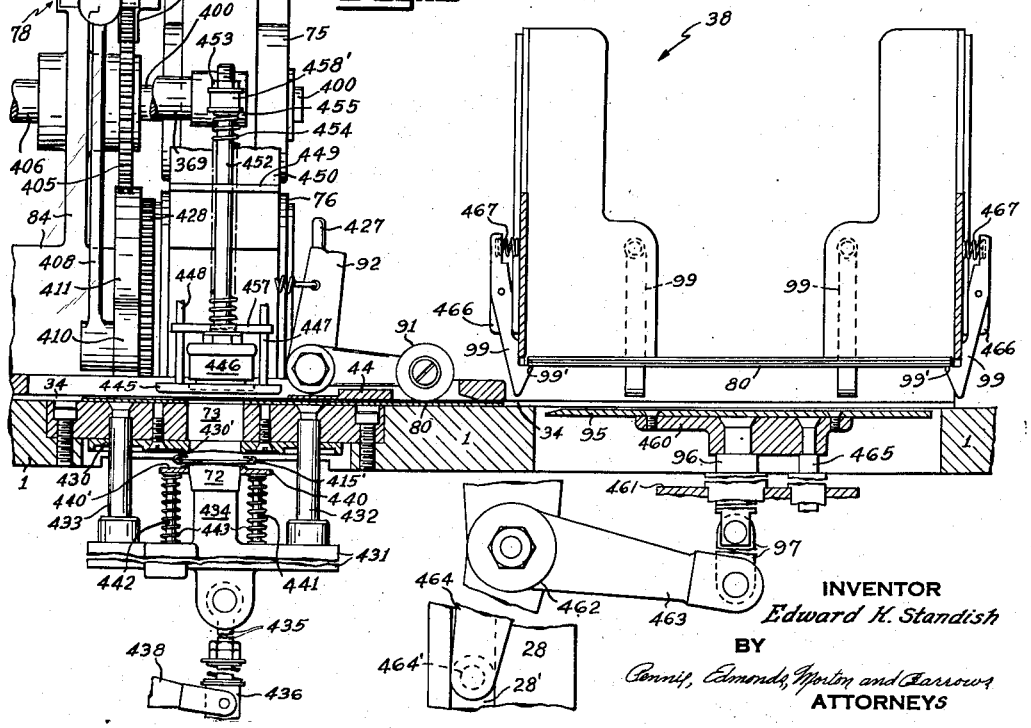
Fig. 18 is a front view partly in elevation and partly in section taken along the lines 18—18 of Fig. 1 and showing the mechanism for applying the protective cover sheet or film and also showing the card stacking mechanism.

The upper connection of the rod 408 with the lever 402 is through the adjustable slide 409, slidably mounted between the two side arms of the lever 402, and this slide can be adjusted lengthwise on said side arms by the adjusting bolt 409' which passes through the cross member 409" at the ends of the arms of the lever 402 (see Figs. 18 and 1).

The roller clutch 411 is similar to the roller clutch 205 of Fig. 9 and serves a similar purpose. It is reciprocated on the shaft 401 much as the roller clutch 205 is reciprocated on the shaft 201 and causes the roll 76 to move with the clutch in one direction but not in the other, thus providing for intermittent movement of the roll 76 in much the same manner that the roll 57 of Figs. 8 and 9 is moved.

The rubber covered roll 420 is a pressure roll for pressing against the rubber covered roll 76 to hold the glassine strip or film firmly therebetween. This roll 420 is mounted on a shaft 421 carried by rocker arms 422 pivotally supported by shaft 424 supported in bearings in the bracket 417 secured to the bed plate 1. The other ends 425 of the rocker arms 422 have recesses in which compression springs 426 are located, the other ends of these springs being in recesses in the bracket 417. These springs act to keep the roll 420 pressed against the roll 76. The roll 420 also has a gear 429 meshing with the gear 428 on the roll 76 so that these rolls will rotate together and in opposite directions. The depth of the gear teeth, however, is such that the gears do not press against each other but permit the roll 420 to be pressed against the roll 76 by the action of the compression springs 426. A hand lever 427 mounted on the shaft 424 permits rotating the rocker arms 422 and the shaft 424 against the spring pressure to lower the roll 420 to permit threading of the glassine strip or film between this roll and the roll 76.

A horizontal guide assembly is located beneath the bed plate 1 to convey the film or cover strip from the rubber covered pressure rolls 76, 420 to the die mechanism 79. This guide assembly includes the block 417 secured to the bed plate and a guide plate therein and a trough 415 in the form of a thin metal strip or slotted groove through which the microfilm or glassine paper strip travels. The form of this strip is shown in Fig. 18. It has curved lateral edges extending upwardly and inwardly and has a width conforming generally to the width of the glassine strip or film to maintain it in centered position. This trough 415 is cut away at its left end (Fig. 16) to provide an opening therethrough for the lower punch member 72. The upwardly extending side portions 415' are also terminated short of the lefthand end, as shown in Fig. 17. The guide assembly is also shown as provided with a glass observation plate 418, also shown in Fig. 17, through which a film can be observed from the top of the machine.

The operation of the feed mechanism for the glassine strip or film is intermittent and is similar to the intermittent feed of the adhesive strip and glassine strip described in connection with Figs. 8 and 9. As the lever 207 of Fig. 8 is reciprocated by its cam 25 and connecting mechanism it acts both on the gear 206 connected to the roller clutch 205 of Fig. 9 and on the spur gear 407 mounted on the shaft 406 (Fig. 8), on which the spur gear 405 (Fig. 16) is also mounted. As this shaft is reciprocated it reciprocates the lever 402 and the connecting rod 408 and the roller clutch 411. As the shaft 406 is thus rotated in a counterclockwise direction (Fig. 16) the lever 402 is rotated in a clockwise direction, raising the rod 408 and the arm 410 and turning the roller clutch 411 in a clockwise direction with corresponding turning of the roll 76. Reciprocal movement of the shaft 406 in a clockwise direction causes the roller clutch to move in a counterclockwise direction without corresponding movement of the roll 76. The resulting intermittent rotation of the rubber covered roll 76 combined with the action of the pressure roll 420 which is correspondingly reciprocated in the opposite direction, causes a predetermined length of cover strip or film to be fed between these rolls through the feed trough 415 to the punch and die block unit 79.

Since the same cam 25 and connecting shaft 406 operates both the vacuum roll 57 for the adhesive strip 61 and the roll 76 for the cover sheet or film, the feed will take place simultaneously and intermittently and in general with corresponding amount of feed. The length of strip fed can be regulated in part by adjusting the slide 210 on the lever 207 shown in Fig. 8. An independent adjustment for the feeding of the cover strip or film can be effected through adjustment of the slide 409 on the lever 402 of Fig. 16. This makes possible the feeding of a somewhat longer strip of film where this is desired, in order to insure registration of the film sections, to be cut out and mounted, with the punch and die by which they are cut out and mounted.

When a film is to be mounted it is important to insure that the central section of each film frame is properly positioned and that the feed of the film strip will correspond to the distance between successive film frames. The glass plate 418 (Figs. 16 and 18) permits the film to be observed as it passes under this plate and has registry marks 419 with which the film frames can be aligned. By varying and adjusting the stroke of the operating clutch arm 410 the amount of film fed can be adjusted to insure that the feed will correspond to the distance between successive film frames.

*Punch and die mechanism for cutting and applying cover strip or film*

The glassine cover strip or film, intermittently fed and supplied as above described, has a section thereof cut out and applied to the opening in the card by the punch and die mechanism indicated generally at 79 in Fig. 1 and shown in greater detail in Figs. 16 and 18. The card with the central portion of the adhesive patch cut out has been moved by the intermittent feeding devices to a position such that the opening in the card is brought above the die opening where a section of film or cover sheet is cut out by the punch 72 and cooperating die member 430 of Figs. 16 and 18.

The punch 72 is carried at the top of a projection 434 of a block 431, slidably mounted on pins 432 depending from the block 73 mounted in an opening in the bed plate 1. The punch carrier 431 is reciprocated vertically by the operation of the cam 27 and connecting mechanism including the rod 435 pivotally attached to the punch carrier 431. This cam shown in the lower portion of Fig. 14 is connected by a bell crank lever 437, supported by bracket 389 and has an arm 438 which is connected to the lower portion of the punch carrier (Fig. 18). The arm 439 of the bell crank lever 437 has a cam follower 439' seated in the cam path 27'; and the other arm 438 is connected to a block 436 slidable on the rod 435, this block being a spring loaded block of the same construction and arrangement as that of the block 300 of Fig. 8.

The punch carrier 431 also carries a spring pressed plate 440 mounted on pins 441 and 442 and having springs 443. This spring pressed plate 440 surrounds the punch 72 and has an integral upwardly extending rim 440'. The upper die block 430 has a corresponding downwardly extending rim 430'. The arrangement is such that as the spring pressed plate 440 is moved upwardly it will clamp the film or glassine paper to the die between the rims 440' and 430' before the punch 72 punches out the section of the paper or film. As the punch carrier is moved upwardly from the position shown in Fig. 18 through the motion of the cam 27, the punch and spring pressed plate move upwardly until the rim 440' engages and holds the paper or film between it and the rim 430' after which the upward movement of the punch 72 cuts out the section of paper or film which is so held. The end of the guide trough 415 is cut away to permit this upward movement without interference. Continued upward movement of the punch 72 will carry the section of paper or film upwardly and press it firmly against the under exposed adhesive surface of the pressure-sensitive adhesive patch in the opening in the card.

Located above the bed plate 1 is a backing plate 445 having pins 447 and 448 secured thereto and extending up through holes in the bracket 449 secured to a support 450 mounted on the bedplate. Above this backing device is a heater block 446 arranged above a correspondingly shaped depression in the backing plate 445. This heater block is connected through boss 451 with the rod 452 which extends upwardly through an opening in the bracket 449 and is connected at its upper end with the lever arm 458, extending therethrough and having a nut 453 thereabove, and also having a compression spring extending around this rod between the boss 451 and the washer 455. A cross plate 457 is secured to the pins 447 and 448 and normally rests on and is supported by the boss 451 of the heater block. The heater block 446 has a connection 456 leading to a source of electric current.

The backing device 445 and heater block 446 are reciprocated vertically by the arm 458 mounted on the same shaft 369 on which the lever 368 is mounted as shown in Fig. 15. When this shaft is reciprocated by the action of the cam 26 and connecting mechanism it actuates both the punch 65 and stripper plate 375 shown in Fig. 15 and the backing plate and heater block shown in Figs. 16 and 17.

The provision of the heater block 446 permits heating of the margin of adhesive material, where this is desired. With pressure sensitive adhesives the heating will not ordinarily be necessary, and the block may be omitted, or it may be used without heating it. Where heat is desirable to increase adhesion as with heat sealing adhesives this heating block is advantageous.

In the operation of the mechanism above described, the downward movement of the backing plate 445 brings it in touch with the top of the card and the further downward movement of the heater plate 446 brings it into contact with this backing plate; and continued downward movement of the lever 458 will cause the backing plate to be pressed against the card and the adhesive material thereon around and in the opening in said card. The intermittent feed of the cover strip or film will have brought a section of film or paper into position to have a section cut out therefrom and mounted in the opening in the card. The upward movement of the punch member 72, as above described, will cut a section of paper or film and force it upwardly against the margin of pressure-sensitive adhesive material in the opening in the card against the backing pressure supplied by the plate 445. The same upward movement of the punch accordingly will cut out a section of the cover strip or film and force it upwardly into the opening in the card and against the under adhesive surface of the adhesive material in the opening. Further operation of the cam mechanism will raise the backing plate and lower the die mechanism to permit the finished card to be moved to the next station and another card to be moved into place.

The rolls 76, 420 by which the feeding of the strip of cover sheet or film is effected are actuated by the cam 25 through their connecting mechanism and are so timed with reference to the punching and affixing operations that a fresh section of paper or film will be fed intermittently in timed relation and will then be punched to remove a section therefrom and have the section applied to the opening in the card, and these operations will be repeated intermittently as successive cards are moved into place as the finished cards are removed.

*Completed-card stacking mechanism*

The finished cards, produced by the operations above described, may be collected and stored in any suitable manner but are advantageously combined and stacked in stacking mechanism provided and operated as a part of the mechanism of the completed machine.

The stacking mechanism is shown in perspective in Fig. 1 and in more detail in Fig. 18.

Counting mechanism for counting the cards before stacking is also illustrated. As the card with the glassine cover sheet or film mounted in the opening is moved from the station above described to the stacking mechanism the leading edge of the card slides under a counting wheel 91 which extends through an opening in the plate 44 and rests lightly in the feed trough 34. This counting wheel is supported on one arm of a counting lever 92 which is pivotally supported above the top surface of the bed plate 1 and which has a vertical arm which actuates a micro-switch 93, which through suitable electric connections activates an electric counter 94 (Fig. 1).

The finished cards are moved successively past the counting wheel by the last feed latch 37 of the card feeding mechanism previously described and are brought successively to a position beneath the hopper 38 where they are supported by the stacking plate 95.

Surrounding the stacking plate 95 and vertically mounted on the top of the bed plate 1 are the side frames of the stacking hopper which is shown as constructed in a manner similar to that of the hopper 30. Mounted on the side and end plates of the hopper are pivoted fingers 99 supported in blocks 466 and being spring pressed by springs 467. The hopper plates are cut away at the bottom to permit the lower ends 99' of these fingers to project into the hopper. These projecting portions are bevelled upwardly and have a horizontal ledge as shown in Fig. 18.

The stacking plate 95 is mounted on a block 460 and is carried by an arm 96, the lower end of which is pivotally connected to a link 97 which in turn is pivotally connected with the bell crank lever 462 through the arm 463. The other arm 464 has a cam follower 464' operated by the cam path 28' of the cam 28 (see also Fig. 25). The lever 462 is pivotally supported by a bracket depending from the bed plate.

Also attached to the block 460 is a downwardly extending guide pin 465, extending downwardly through the guide block 461 through which the rod 96 also extends.

As each completed card is moved into position on the stacking plate 95, the cam 28 and its connecting mechanism raise said plate and therewith the card and move it upwardly into the bottom portion of the hopper, forcing the edges of the card past the projecting portions 99' of the finger members 99 so that the cards will be supported thereby. In this upward movement the stacking plate is guided by the arm 96 and the pin 465 moving in guides formed in the guide block 461. As each card is thus moved up into place the stacking plate stops and is returned to the position shown in Fig. 18, where it is ready to receive the next card.

While in the foregoing description the various stations and mechanisms have been more or less separately described, it will be understood that all of the operating parts are driven by the same drive shaft and cam shaft and through the various cams and cam operated connections so that the various operations are taking place simultaneously on different cards and successively on the same card and in timed relation.

Thus the card feed mechanism will simultaneously move a card from the card feed hopper to the card cutting and compressing station, another card with the opening cut therein from that station to the next station where the adhesive material is cut out and applied thereto, another card with the adhesive material applied thereto from that station to the station where the central portion of the adhesive material is cut out, another card from that station to the station where the protective sheet or film is inserted in the card, and another card in finished condition from such station to the stacking hopper. During the short time interval that each card is in position in the different stations the various operations that are carried out at the different stations will take place. And the cards from these successive operations will then be moved along to the next operation. A large number of blank cards can thus be converted into finished cards in a rapid and automatic manner.

In the foregoing description only a single aperture is punched in the card but it will be understood that a card may have two or more openings therein, with adhesive applied thereto and protective cover sheets or films mounted therein. By taking cards which have passed once through the machine and reversing their ends and passing them through again cards may be prepared with two openings having adhesive applied thereto and with cover sheets or films in the opening.

By turning the cards over and putting them through again a third opening can be provided, etc.

The improved apparatus of the present invention is particularly advantageous for carrying out the complete series of operations above described. It is also well adapted for use in carrying out less than the full number of operations. For example, if the cards have previously been provided with an opening therein, the punching operation may be omitted and the other operations carried out. If it is desired to punch an opening in the card without forming a shoulder in the card around the opening the shoulder by which the compressing operation is carried out can be omitted or rendered inactive. So also, where it is desired to have the transparent adhesive patch extend over the entire opening, the step of cutting out the central portion of this patch can be omitted.

The various mechanisms previously described are operated by their own cams and cam operated levers, etc. so that by disconnecting any particular cam and its connecting mechanism any one or more of the stations can be rendered inactive while the others are used much as above described. By using only the card feed mechanism and the punching and compressing mechanism, and by omitting or rendering inactive the other stations, cards can be prepared which are punched and have a compressed shoulder around the opening and these cards can be produced as finished cards for subsequent use, e. g., in film mounting machines.

Where it is desired to have the pressure-sensitive adhesive material extend over the entire area of the opening so that a microfilm or other insert can be placed in the opening, the dieing out operation can be omitted by disconnecting the cam operated mechanism which operates this station. Where cards have been previously punched, the punching and compressing mechanism can be omitted or rendered inactive and the machine then becomes a mounting machine for feeding the individual punched cards, applying the adhesive material thereto, and then applying a protective cover sheet of glassine or the like to the opening against the adhesive material or by mounting a microfilm or the like in the opening against the adhesive material.

The machine is particularly adapted for use with pressure-sensitive adhesive strips having a protective layer of glassine and the like but it is also adapted for use with strips of heat sealing adhesive which do not require any protective cover sheet of glassine and which can be supplied and cut off and attached to the cards by heating the marginal portion of the adhesive to hold it in place. And the film can similarly be secured to such heat sealing adhesive or to a marginal rim thereof by heating at the time the pressure is applied thereto to secure the film in place.

It will thus be seen that the invention includes a complete machine for taking blank cards, dieing out apertures therein, compressing the card around the aperture, separating pressure-sensitive adhesive strips from protective strips of glassine and the like, dieing off or shearing off sections of such adhesive material and applying them to the card around the opening, dieing out an aperture in the adhesive patch so applied, dieing out or shearing off glassine of proper dimensions and applying it to the adhesive margin in the opening or alternatively dieing out film sections and applying them, and counting and stacking the resulting finished cards.

It will also be seen that the invention includes various new subcombinations of elements and mechanisms for carrying out various combinations and subcombinations of said operations as well as improved mechanism for the individual operations, with the entire machine operating as a unitary machine for supplying cards one at a time in a rapid and intermittent manner and with carrying out of the successive operations on the cards at the successive stations simultaneously and intermittently with the cards so intermittently supplied.

Modifications and variations can be made from the specific construction illustrated and described without departing from the spirit and scope of the invention, as set forth in the accompanying claims.

I claim:

1. A card preparing machine having a bed plate with a card trough extending along the top thereof, a card feed hopper at one end and a card stacking hopper at the other end of the card trough, a series of intermediate stations along the card trough with mechanism mounted on the bed plate for acting simultaneously on a like series of cards at said stations, including a first card punching and compressing station with mechanism for punching an opening in a first card and compressing the card around the opening to form a depression on one side of said card, a second adhesive sheet applying station having mechanism for supplying a continuous adhesive sheet, cutting out a section thereof and applying it to a second card over a like opening therein and in a like depression around said opening, a third station having dieing out mechanism for punching out the central portion of a like adhesive sheet over a like opening and in a like depression in a third card to leave a margin of said adhesive material, and a fourth mounting station with mechanism for applying a section of microfilm, glassine and the like in a like opening in a fourth card and against a like margin of adhesive material on said fourth card, means for operating all said mechanisms simultaneously once during each cycle of operation of said machine, feeding devices arranged along said card trough and mounted on said bed plate and operable in unison and in timed relation with the operation of said mechanisms for simultaneously feeding a card blank from said feed hopper to said first station, the fourth card from said fourth station to said stacking hopper, and the first, second and third cards from said first, second and third stations, respectively, to said second, third and fourth stations, respectively, during each cycle of operation of said machine, and means for operating said feeding devices.

2. A card preparing machine having a bed plate with a card trough extending along the top thereof, a card feed hopper at one end and a card stacking hopper at the other end of the card trough, a series of intermediate stations along the card trough with mechanism mounted on the bed plate for acting simultaneously on a like series of cards at said stations, including a first card punching and compressing station with mechanism for punching an opening in a first card and compressing the card around the opening to form a depression on one side of said card, a second adhesive sheet applying station having mechanism for supplying a continuous adhesive sheet, cutting out a section thereof and applying it to the second card over a like opening therein and in a like depression around said opening, and a third mounting station with mechanism for applying a section of microfilm, glassine and the like in a like opening in a third card and against a like margin of adhesive material on said third card, means for operating all said mechanisms simultaneously once during each cycle of operation of said machine, feeding devices arranged along said card trough and mounted on said bed plate and operable in unison and in timed relation with the operation of said mechanisms for simultaneously feeding a card blank from said feed hopper to said first station, the third card from said third station to said stacking hopper, and the first and second cards from said first and second stations, respectively, to said second and third stations, respectively, during each cycle of operation of said machine, and means for operating said feeding devices.

3. A card preparing machine for cards having an opening therein, said machine having a bed plate, a card feed hopper at one end and a card stacking hopper at the other end of said bed plate, a series of intermediate stations along said bed plate with mechanism mounted on the bed plate for acting simultaneously on a like series of cards at said stations, including an adhesive sheet applying station having mechanism for supplying a continuous adhesive sheet, cutting out a section thereof and applying it to one card over the opening therein, a dieing-out station having dieing out mechanism for punching out the central portion of a like adhesive sheet on another card and over the opening in said card to leave a margin of said adhesive material, a mounting station for applying a section having mechanisms of microfilm, glassine and the like in the opening in a third card and against a like margin of adhesive material on said third card, means for operating said mechanisms simultaneously once during each cycle of operation of said machine, feeding devices arranged along and mounted on said bed plate and operable in unison and in timed relation with the operation of said mechanisms for simultaneously feeding a card with an opening therein from said feed hopper to said adhesive sheet applying station, the third card from said mounting station to said stacking hopper, and the cards at the adhesive sheet applying station and the dieing-out station from said adhesive sheet applying station and said dieing-out station to the dieing-out station and the mounting station, respectively, during each cycle of operation of said machine, and means for operating said feeding devices.

4. A card preparing machine for cards having an opening therein, said machine having a bed plate, a card feed hopper at one end and a card stacking hopper at the other end of said bed plate, a series of intermediate stations along said bed plate with mechanism mounted on the bed plate for acting simultaneously on a like series of cards at said stations, including an adhesive sheet applying station having mechanism for supplying a continuous adhesive sheet, cutting out a section thereof and applying it to one card over the opening therein, a mounting station having mechanism for applying a section of microfilm, glassine and the like in the opening in another card and against a like section of adhesive material on said another card, means for operating said mechanisms simultaneously once during each cycle of operation of said machine, feeding devices arranged along and mounted on said bed plate and operable in unison and in timed relation with the operation of said mechanisms for simultaneously feeding a card with an opening therein from said feed hopper to said adhesive sheet applying station, the card at the mounting station from said mounting station to said stacking hopper, and the card at the adhesive sheet applying station from said adhesive sheet applying station to said mounting station during each cycle of operation of said machine, and means for operating said feeding devices.

5. A card preparing machine having a bed plate, a card feed hopper at one end and a card stacking hopper at the other end of said bed plate, an intermediate station with mechanism mounted on the bed plate for acting on the cards successively disposed at said station in operative relation with said mechanism, including card punching and compressing mechanism for punching an opening in the successive cards and compressing each card around the opening to form a depression in the surface of each card on one side thereof and reduce the thickness of the marginal portions of the card surrounding said opening, feeding devices arranged along and mounted on said bed plate and operable in unison for simultaneously feeding a blank card from the card feed hopper to the punching and compressing mechanism, and the card at said punching and compressing mechanism to the stacking hopper, and actuating means for said feed devices and for the punching and compressing mechanism at said station to cause said mechanism and devices to act in timed relation with each other and one of said feeding devices to feed the blank card from the card feed hopper to the punching and compressing mechanism and another of said feeding devices to feed the punched and compressed card from said punching and compressing mechanism to the stacking hopper.

6. A card preparing machine including feeding means for feeding blank cards intermittently into said machine one at a time, adhesive material applying mechanism for supplying a strip of thin adhesive tape, for cutting patches therefrom and applying a patch to each card over and around an aperture in said card, said adhesive material applying mechanism including means for rotatably supporting a supply roll for supplying a composite strip of such adhesive tape and protective tape, separating rolls including a rubber covered roll for removing the protective tape and a vacuum roll for the separated adhesive tape, said vacuum roll having holes in the periphery thereof and means for applying suction to the portion of said holes adjacent the separating roll, means for cutting off successive patches of said adhesive tape and for applying them to the card over and around the opening, feeding means for removing cards from said machine, and operating mechanism for operating said feeding means and said adhesive material applying mechanism in timed relation to supply, cut-off, and apply a patch of the adhesive tape to each card.

7. A card preparing machine including feeding means for feeding blank cards intermittently into said machine one at a time, adhesive material applying mechanism for supplying a strip of thin adhesive tape, for cutting patches therefrom and applying a patch to each card over and around an aperture in said card, said adhesive material applying mechanism including means for supplying and feeding a continuous strip of adhesive tape intermittently, means for severing a predetermined length from said tape including a stationary and a movable knife member normally separated, feeding means for feeding a predetermined length of tape past said knives, operating means for actuating the movable knife member to cut off said length, means for holding said length and for applying it to a card over and around an opening therein, feeding means for removing cards from said machine, and operating mechanism for operating said feeding means and said adhesive material applying mechanism in timed relation to supply, cut off, and apply a patch of the adhesive tape to each card.

8. A card preparing machine such as defined in claim 7 in which the means for holding the cut off length of adhesive tape and for applying it to the card includes a pivotally mounted rocker, a rotatable shaft supported by said rocker, an arm mounted on said shaft for rotation therewith, a suction plate carried by said arm, said plate being adapted to be located in a receiving position beneath said knives, means for suppling suction to said plate for drawing onto said plate the non-adhesive surface of said predetermined length of the adhesive tape, a block supporting the card, means for rotating said shaft to move said plate from such receiving position to a substantially horizontal position above the card supported on said block, and means for pivoting said rocker to force said plate with the severed length of the adhesive tape held thereon against the card.

9. A card preparing machine including feeding means for feeding cards intermittently into said machine one at a time, each of said cards having a patch of material affixed thereto over an aperture formed in the card, mechanism for cutting out a portion of the patch of material affixed to each card, comprising a die having a die opening therein and adapted to support a card thereon with said patch located over said opening, a raised rim on said die surrounding and immediately adjacent said opening, said rim extending up into the aperture formed in said card and engaging the under surface of a corresponding rim portion of said patch when said card is supported on said die, a support frame, a vertically reciprocatable slide mounted in said frame, a punch mounted on the lower portion of said slide and disposed over said die opening, means connected to said slide for reciprocating said punch into and out of said die opening, feeding means for successively removing the cards from said machine, and operating mechanism for operating said card feeding means and said punch in timed relation to feed successive cards to said patch portion cutting mechanism, die-out a portion of the patch on each successive card, and remove the cards successively from the machine.

10. Apparatus as defined in claim 9, and including a stripper plate mounted on said slide for vertical movement relative to said punch, said plate surrounding and having its lower surface normally disposed below the cutting face of said punch and being adapted to move vertically with said slide to press said patch firmly against said card and said raised rim before said punch moves into said die opening.

11. Apparatus as defined in claim 9 and including a stripper plate surrounding the lower portion of said punch and mounted on said slide for vertical movement relative to said punch, a spring associated with said plate for normally maintaining the lower surface of said plate below the cutting surface of said punch but permitting said plate to move vertically with said slide and relative to said punch to press said patch firmly against said card and said raised rim as said punch reciprocates into and out of said die opening.

12. A card preparing machine having card stacking mechanism including a vertically disposed hopper having openings provided in the sides thereof adjacent the lower end, a card supporting finger pivotally mounted on the outside of said hopper adjacent each of said openings and having the lower portion thereof normally projecting into said hopper through the opening, each such inwardly projecting finger portion having a ledge formed therein, the ledges of said finger portions being arranged to support a card thereon within said hopper, a plate normally positioned directly beneath said hopper and adapted to receive one card at a time thereon, and means for vertically reciprocating said plate within the bottom portion of said hopper whereby the card carried on said plate is moved up past the inwardly projecting portions of said fingers and deposited on the ledges thereof.

13. A card preparing apparatus for mounting a film section or the like in a card having an aperture formed therein and having a piece of thin adhesive material affixed thereto and extending at least partially over said aperture, comprising a die block having a die opening and adapted to support a card thereon with that portion of the material extending over the card aperture positioned over said die opening, a backing device mounted above said die opening for reciprocation into pressing engagement with the upper surface of said material, means for successively feeding predetermined lengths of a strip of film or the like to bring them beneath said die opening, a punch mounted below said die block for vertical reciprocation through the opening in said die block, and means for moving said punch up through said openings to punch out a section from said strip and to transport such section upwardly through said die opening to affix said section firmly on the under surface of that portion of said adhesive material extending over the aperture of the card positioned on said die block.

14. Apparatus as defined in claim 13, including a clamp plate mounted by springs around the upper end of said punch and arranged to press the film section firmly against the die surface of said die block before said punch engages said section of said strip.

15. Apparatus as defined in claim 13, including means for feeding said strip intermittently beneath said die opening, such feeding means comprising a feed roll, a second roll mounted for peripheral engagement with said feed roll, gears associated with said rolls for rotating said rolls in opposite directions, means including a roller clutch associated with said feed roll for positively rotating said feed roll intermittently in one direction to feed predetermined lengths of said strip between said rolls and beneath the die opening in timed relation with respect to the reciprocation of said punch.

16. A card preparing machine having a bed plate with a card trough extending along the top thereof, a series of spaced stations along the card trough with mechanism mounted on the bed plate for acting on the cards at said stations and feeding devices for feeding cards one at a time successively and intermittently through the card trough to said stations, said feeding devices including reciprocating slides mounted in the bed plate below the card trough and a series of pivotally mounted latches carried by said slides for engaging the trailing end of the cards to move them to the successive stations in one direction and moving out of engagement with the cards when reciprocated in the opposite direction, and actuating means for said card feeding means and for the mechanism of said stations to effect operation on successive cards simultaneously at the different stations and intermittent movement of the cards from one station to the next between such operations.

17. A card preparing machine such as defined in claim 16 which also has a feed hopper for supplying the cards one at a time to the card trough and feeding means for feeding the cards from said hopper to said trough simultaneously with the feeding of the cards from one station to the next in the feed trough.

18. A card preparing machine having a bed plate with a card trough extending along the top thereof, a card feed hopper above one end of the card trough, a series of stations along the card trough with mechanism mounted on the bed plate for acting on the cards at such stations, and means for collecting completed cards, said machine having feeding devices for feeding the cards successively one at a time from the feed hopper to the feed trough and successively to the stations in said trough, the card feed trough having a suction block therein at the discharge side of the card feed hopper with means for supplying suction thereto to hold the cards thereagainst as they are moved one at a time from the feed hopper through the card feed trough.

19. A card preparing machine having a bed plate with a card trough extending along the top thereof, feeding means for supplying cards one at a time intermittently thereto and for removing finished cards therefrom, a series of intermediate stations along the card trough with mechanism mounted on the bed plate for acting on the cards at said stations, feeding devices for feeding cards one at a time successively and intermittently to and through the card feed trough to such stations, and actuating means for said feeding devices and for the mechanism at said stations to cause said mechanism to act on successive cards intermittently and substantially simultaneously, said actuating means including a cam shaft provided with a plurality of cams and cam operated arms and levers connected to said feeding means and to said mechanism to operate the same in timed relation to each other.

20. In a machine for mounting small units of photographic film within openings punched therefor in business machine cards or the like which cards are provided with transparent adhesive film for retaining the photographic film units in the opening, a punch, means for feeding a predetermined portion of a strip of photographic film underneath the punch, means for feeding cards synchronized with the film feeding means for positioning the respective card openings momentarily under the punch, means subsequently effective for operating the punch to cut out a predetermined portion of photographic film from the strip and press it into the card opening and against the adhesive film and means for ejecting the respective cards from the punch after each punching operation.

21. A card preparing machine comprising a plurality of mechanisms arranged along a predetermined path travelled by successive cards for acting simultaneously on a like plurality of cards positioned in operative relation therewith, said mechanisms including a first card punching and compressing mechanism for cutting an opening in one card and compressing said card around said opening to form a depression on one side of said card, a second adhesive sheet applying mechanism for feeding a strip of adhesive material, cutting a sheet therefrom and applying said sheet to another card over a like opening therein and in a like depression in said card, and a third mounting mechanism for feeding a strip of insert material, cutting an insert sheet therefrom and mounting said insert sheet in a like opening in a third card and against a like adhesive sheet on said third card and in a like depression in said third card, means for operating all said mechanisms simultaneously once during each cycle of operation of said machine, feeding devices arranged along said path and operable in unison and in timed relation with the operation of said mechanisms for simultaneously feeding the third card from said third mechanism, the cards at the first and second mechanisms from said first and second mechanisms to said second and third mechanisms, respectively, and a card blank to said first mechanism during each cycle of operation of said machine, and means for operating said feeding devices.

22. A card preparing machine comprising a plurality of mechanisms arranged along a predetermined path travelled by successive cards for acting simultaneously on a like plurality of cards positioned in operative relation therewith, said mechanisms including a card punching and compressing mechanism for cutting an opening in one card and compressing said card around said opening to form a depression on one side of said card, and a succeeding sheet applying mechanism for feeding a strip of adhesive material, cutting a sheet therefrom and applying said sheet to another card over a like opening therein and in a like depression in said card, means for operating said punching and compressing mechanism and said sheet applying mechanism simultaneously once during each cycle of operation of said machine, feeding devices arranged along said path and operable in unison and in timed relation with the operation of said mechanisms for simultaneously feeding the card at the adhesive sheet applying mechanism from said adhesive sheet applying mechanism, the card at the punching and compressing mechanism from said punching and compressing mechanism to said sheet applying mechanism, and a card blank to said punching and compressing mechanism during each cycle of operation of said machine, and means for operating said feeding devices.

23. A card preparing machine comprising a plurality of mechanisms arranged along a predetermined path travelled by successive cards for acting simultaneously on a like plurality of cards positioned in operative relation therewith, said mechanisms including a first card punching and compressing mechanism for cutting an opening in a first card and compressing said card around said opening to form a depression on one side of said card, a second adhesive sheet applying mechanism for feeding a strip of adhesive material, cutting a sheet therefrom and applying said sheet to a second card over a like opening therein and in a like depression in said second card, a third punching mechanism for removing the central portion of a like adhesive sheet on a third card over a like opening and in a like depression in said third card, removal of said central portion leaving a margin of the adhesive sheet projecting into the card opening, and a fourth mounting mechanism for feeding a strip of insert material, cutting an insert sheet therefrom and mounting said insert sheet in a like opening in a fourth card and against a like adhesive margin of a like adhesive sheet in a like depression in said fourth card, means for operating all said mechanisms simultaneously once during each cycle of operation of said machine, feeding devices arranged along said path and operable in unison and in timed relation with the operation of said mechanisms for simultaneously feeding the fourth card from said fourth mechanism, the first, second and third cards from said first, second and third mechanisms, respectively, to said second, third and fourth mechanisms, respectively, and a card blank to said first mechanism during each cycle of operation of said machine, and means for operating said feeding devices.

24. A card preparing machine comprising a plurality of mechanisms arranged along a predetermined path travelled by successive cards for acting simultaneously on a like plurality of cards positioned in operative relation therewith, said mechanisms including a first card punching mechanism for cutting an opening in a first card, a second adhesive sheet applying mechanism for feeding a strip of adhesive material, cutting a sheet therefrom and applying said sheet to a second card over a like opening in said second card, a third punching mechanism for removing the central portion of a like adhesive sheet on a third card and over a like opening in said third card, removal of said central portion leaving a margin of the adhesive sheet projecting into the card opening, and a fourth mounting mechanism for feeding a strip of insert material, cutting an insert sheet therefrom and mounting said insert sheet in a like opening in a fourth card and against a like adhesive margin of a like adhesive sheet on said fourth card, means for operating all said mechanisms simultaneously once during each cycle of operation of said machine, feeding devices arranged along said path and operable in unison and in timed relation with the operation of said mechanisms for simultaneously feeding the fourth card from said fourth mechanism, the first, second and third cards from said first, second and third mechanisms, respectively, to said second, third and fourth mechanisms, respectively, and a card blank to said first mechanism during each cycle of operation of said machine, and means for operating said feeding devices.

25. A card preparing machine such as defined in claim 7 wherein the means for holding the severed length of adhesive tape and for applying it to the card comprises a pivotally mounted rocker arm, a rotatable shaft journalled in said arm, a second arm fixed to said shaft, a suction plate carried by said second arm, said plate being located beneath the knives in position to receive the fed length of adhesive tape, air blast means for directing a stream of air under pressure toward said fed length of adhesive tape to urge the latter toward the suction plate for action thereon by said suction plate, means for creating vacuum in said plate for gripping the severed length of adhesive tape at the non-adhesive side thereof, means for rotating said shaft to move said plate from its tape receiving position to a substantially horizontal position above the card, and means for swinging said rocker arm, said shaft, said second arm and said plate as a unit toward the card to apply the severed length of adhesive tape to the card.

26. A card preparing machine comprising a plurality of mechanisms arranged along a predetermined path travelled by successive cards for acting simultaneously on a like plurality of cards positioned in operative relation therewith, said mechanisms including a first card punching mechanism for cutting an opening in a first card, a second adhesive sheet applying mechanism for feeding a strip of adhesive material, cutting a sheet therefrom and applying said sheet to a second card over a like opening in said card, and a third mounting mechanism for feeding a strip of insert material, cutting an insert sheet therefrom and mounting said insert sheet in a like opening in a third card and against a like adhesive sheet on said third card, means for operating all said mechanisms simultaneously once during each cycle of operation of said machine, feeding devices arranged along said path and operable in unison and in timed relation with the operation of said mechanisms for simultaneously feeding the third card from said third mechanism, the first and second cards from said first and second mechanisms, respectively, to said second and third mechanisms, respectively, and a card blank to said first mechanism during each cycle of operation of said machine, and means for operating said feeding devices.

27. A card preparing machine comprising a plurality of mechanisms arranged along a predetermined path travelled by successive cards for acting simultaneously on a like plurality of cards positioned in operative relation therewith, said mechanisms including an adhesive sheet applying mechanism and a succeeding insert sheet mounting mechanism, said adhesive sheet applying mechanism having means for intermittently feeding a strip of adhesive material, means for cutting a sheet from said strip, and means for applying said sheet to one card over an opening in said card, said insert sheet mounting mechanism having means for intermittently feeding a strip of insert material, and means for cutting an insert sheet from said strip of insert material and for mounting said insert sheet in a like opening in another card and against a like adhesive sheet on said card, means for operating said adhesive strip feeding means once during each cycle of operation of said machine, other means for operating said adhesive sheet cutting and applying means once during each cycle, means for operating said insert strip feeding means, means for operatively connecting said adhesive strip feeding means with said insert strip feeding means whereby the latter is operated from and concurrently with the adhesive strip feeding means, other means for operating said insert sheet cutting and mounting means concurrently with the operation of said adhesive sheet applying means, feeding devices arranged along said path and operable in unison and in timed relation with the operation of said mechanisms for simultaneously feeding the card at the insert sheet mounting mechanism from said insert sheet mounting mechanism, the card at the adhesive sheet applying mechanism from said adhesive sheet applying mechanism to said insert sheet mounting mechanism, and a card with an opening therein to said adhesive sheet applying mechanism during each cycle of operation of said machine, and means for operating said feeding devices.

28. A card preparing machine comprising a plurality of mechanisms arranged along a predetermined path travelled by successive cards for acting simultaneously on a like plurality of cards positioned in operative relation therewith, said mechanism including an adhesive sheet applying mechanism and a succeeding insert sheet mounting mechanism, said adhesive sheet applying mechanism having means for intermittently feeding a composite strip of adhesive tape and protective tape, means for separating said protective tape from said adhesive tape, means for cutting a sheet from said adhesive tape, and means for applying said sheet to one card over an opening in said card, means for directing said protective tape from said adhesive sheet applying mechanism to said insert sheet mounting mechanism, said insert sheet mounting mechanism having means for intermittently feeding said protective tape, means for cutting an insert sheet from said protective tape and for mounting said insert sheet in a like opening in another card and against a like adhesive sheet on said card, means for operating said composite strip feeding means, said protective tape separating means and said protective tape feeding means in unison once during each cycle of operation of the machine, means for operating said adhesive sheet cutting applying means and said protective insert sheet cutting and mounting means in unison during said cycle, feeding devices arranged along said path and operable in unison and in timed relation with the operation of said mechanisms for simultaneously feeding the card at the insert sheet mounting mechanism from said insert sheet mounting mechanism, the card at the adhesive sheet applying mechanism from said adhesive sheet applying mechanism to said insert sheet mounting mechanism, and a card with an opening therein to said adhesive sheet applying mechanism during each cycle of operation of said machine, and means for operating said feeding devices.

EDWARD K. STANDISH.

References Cited in the file of this patent

UNITED STATES PATENTS

| Number | Name | Date |
|---|---|---|
| 196,305 | Nagel | Oct. 23, 1877 |
| 354,412 | Harrington | Dec. 14, 1886 |
| 489,547 | Shipley | Jan. 10, 1893 |
| 708,675 | Stuparich | Sept. 9, 1902 |
| 728,226 | Hargraves | May 19, 1903 |
| 807,295 | Lincoln | Dec. 12, 1905 |
| 1,381,318 | Lund | June 14, 1921 |
| 1,404,068 | Swift | Jan. 17, 1922 |
| 1,533,236 | Dawson | Apr. 14, 1925 |
| 2,015,987 | Bayer | Oct. 1, 1935 |
| 2,081,175 | Friden | May 25, 1937 |
| 2,264,339 | Sherman | Dec. 2, 1941 |
| 2,282,127 | Gabbert | May 5, 1942 |
| 2,289,336 | Bamford | July 14, 1942 |
| 2,310,556 | Strong | Feb. 9, 1943 |
| 2,322,547 | Shalla | June 22, 1943 |
| 2,325,405 | Jagosz | July 27, 1943 |
| 2,341,461 | Matson | Feb. 8, 1944 |
| 2,367,015 | Finzel et al. | Jan. 9, 1945 |
| 2,409,631 | Jones | Oct. 22, 1946 |
| 2,493,159 | Morrison | Jan. 3, 1950 |
| 2,494,129 | Holton | Jan. 10, 1950 |
| 2,555,218 | Bailey | May 29, 1951 |
| 2,587,022 | Langan | Feb. 26, 1952 |